US012168899B2

(12) United States Patent
Denormand et al.

(10) Patent No.: US 12,168,899 B2

(45) Date of Patent: Dec. 17, 2024

(54) WINDOW BALANCE ASSEMBLY AND MOUNTING BRACKET THEREFOR

(71) Applicant: ASSA ABLOY FENESTRATION, LLC, Rochester, NY (US)

(72) Inventors: Richard S. Denormand, Victor, NY (US); Andrew Baglio, Rochester, NY (US); Eric Mertz, Webster, NY (US); Jay Sofianek, Webster, NY (US)

(73) Assignee: ASSA ABLOY FENESTRATION, LLC, Rochester, NY (US)

(*) Notice: Subject to any disclaimer, the term of this patent is extended or adjusted under 35 U.S.C. 154(b) by 0 days.

(21) Appl. No.: 17/892,628

(22) Filed: Aug. 22, 2022

(65) Prior Publication Data

US 2023/0073314 A1 Mar. 9, 2023

Related U.S. Application Data

(60) Provisional application No. 63/241,847, filed on Sep. 8, 2021.

(51) Int. Cl.

*E05D 15/16* (2006.01)
*E05D 13/00* (2006.01)

(52) U.S. Cl.

CPC ......... *E05D 13/1276* (2013.01); *E05D 15/16* (2013.01); *E05Y 2201/482* (2013.01); *E05Y 2600/528* (2013.01); *E05Y 2600/626* (2013.01); *E05Y 2900/148* (2013.01)

(58) Field of Classification Search

CPC .......... E05D 13/1276; E05D 2600/528; E05Y 2201/482; E05Y 2600/626; E05Y 2900/148

See application file for complete search history.

(56) References Cited

U.S. PATENT DOCUMENTS

| | | | |
|---|---|---|---|
| 887,968 | A | 5/1908 | Selkirk |
| 2,602,958 | A | 7/1952 | Brown |
| 3,364,622 | A | 1/1968 | Collard |

(Continued)

FOREIGN PATENT DOCUMENTS

| | | | | | |
|---|---|---|---|---|---|
| CA | 2864025 | A1 * | 3/2011 | ......... | E05D 13/1276 |
| CA | 2846728 | A1 * | 9/2014 | ......... | E05D 13/1276 |
| GB | 2278626 | A | 12/1994 | | |

OTHER PUBLICATIONS

International Search Report, Written Opinion and International Preliminary Report on Patentability (with 37 sheets of annexes) for PCT/US2011/024134; ISA/US.

*Primary Examiner* — Emily M Morgan

(74) *Attorney, Agent, or Firm* — Harness, Dickey & Pierce, P.L.C.

(57) ABSTRACT

A window balance assembly and a mounting bracket for a window balance assembly are provided. The mounting bracket includes a planar-shaped body having opposed planar surface with an opening extending through the body from one surface to the other. The mounting bracket further includes first and second hooks extending from the same edge of the body that selectively engage a curl spring and a carrier of a window balance assembly. The first hook is oriented in a different direction than the second hook such that the first hook has an upward bend and the second hook has a downward bend.

24 Claims, 21 Drawing Sheets

(56) References Cited

U.S. PATENT DOCUMENTS 4,227,345 A * 10/1980 Durham, Jr. ........ E05D 13/1276 49/181
4,300,316 A 11/1981 Ficurilli
4,570,382 A 2/1986 Suess
4,642,845 A 2/1987 Marshik
4,785,581 A 11/1988 Abramson et al.
4,953,258 A 9/1990 Mennuto
4,958,462 A 9/1990 Cross
5,036,621 A 8/1991 Iwasaki
5,127,192 A 7/1992 Cross
5,157,808 A * 10/1992 Sterner, Jr. .......... E05D 13/1276 267/156
5,353,548 A 10/1994 Westfall
5,463,793 A * 11/1995 Westfall .................. E05D 15/22 16/197
5,566,507 A 10/1996 Schmidt et al.
5,661,927 A * 9/1997 Polowinczak ...... E05D 13/1276 49/446
5,699,636 A 12/1997 Stark
5,806,243 A 9/1998 Prete et al.
5,852,854 A 12/1998 Pierrot et al.
6,041,476 A 3/2000 deNormand
6,119,398 A 9/2000 Yates, Jr.
6,305,126 B1 10/2001 Hendrickson et al.
6,378,169 B1 * 4/2002 Batten ................. E05D 13/1276 16/197
6,679,000 B2 1/2004 Uken et al.
6,763,550 B2 7/2004 Regnier
6,820,368 B2 11/2004 Uken et al.
6,857,228 B2 2/2005 Kunz et al.
6,860,066 B2 3/2005 Kunz et al.
6,931,788 B2 8/2005 Uken et al.
6,990,710 B2 * 1/2006 Kunz ...................... E05D 13/08 49/181
7,191,562 B2 3/2007 Uken et al.
7,735,191 B2 6/2010 Tuller
8,074,402 B2 12/2011 Tuller
8,539,642 B2 * 9/2013 Baker ................. E05D 13/1276 16/400
8,561,260 B2 10/2013 Baker et al.
8,813,310 B2 8/2014 Baker et al.
8,819,896 B2 9/2014 Kellum, III et al.
8,850,745 B2 10/2014 Sofianek et al.
8,918,979 B2 12/2014 Baker
RE45,328 E 1/2015 Tuller
8,966,822 B2 3/2015 Sofianek et al.
9,003,710 B2 4/2015 Kellum, III et al.
9,121,209 B2 9/2015 Baker et al.
9,181,748 B2 11/2015 Sofianek et al.
9,371,677 B1 * 6/2016 Kunz ...................... E05D 15/22
9,458,655 B2 10/2016 deNormand
9,988,834 B2 6/2018 Sofianek et al.
10,053,899 B2 8/2018 deNormand et al.
10,081,972 B1 9/2018 Kunz
10,208,517 B2 2/2019 Lucci et al.
10,563,441 B2 * 2/2020 Kellum, III ......... E05D 13/1292
11,352,821 B2 * 6/2022 Kellum ................... E05D 15/22
2004/0006845 A1 1/2004 Polowinczak et al.
2004/0163209 A1 * 8/2004 Pettit ................... E05D 13/1276 16/197
2004/0244158 A1 12/2004 Awakura et al.
2005/0198775 A1 9/2005 Pettit et al.
2006/0086052 A1 4/2006 Petta et al.
2006/0207185 A1 9/2006 Shuler et al.
2007/0101654 A1 * 5/2007 Robertson ............... E05D 15/22 49/445
2008/0047099 A1 2/2008 Malek
2008/0120804 A1 5/2008 Annes et al.
2008/0178424 A1 7/2008 Tuller
2008/0178425 A1 7/2008 Tuller
2009/0260296 A1 10/2009 Fimbel, III et al.
2011/0239402 A1 10/2011 Steen et al.
2013/0283699 A1 * 10/2013 Kellum, III ............. E05D 13/08 49/429
2014/0000172 A1 * 1/2014 Sofianek ............. E05D 13/1276 49/430
2014/0208653 A1 * 7/2014 Sofianek ............. E05D 13/1276 49/506
2023/0193674 A1 * 6/2023 Kunz ...................... E05D 13/08 16/197

* cited by examiner

WINDOW BALANCE ASSEMBLY AND MOUNTING BRACKET THEREFOR

CROSS-REFERENCE TO RELATED APPLICATION

This application claims the benefit and priority of U.S. Provisional Application No. 63/241,847 filed on Sep. 8, 2021. The entire disclosure of the above application is incorporated herein by reference.

FIELD

The present disclosure relates to a window balance assembly and a mounting bracket for use with the window balance assembly

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modern window assemblies in residential, commercial, and industrial buildings may include one or more window sashes that are movable within a window jamb of a window frame. Window sashes that move vertically to open and close often include two or more window balance assemblies. The balance assemblies urge the window sash upward (e.g., toward an open position for a lower sash or toward a closed position for an upper sash) to assist a user in moving the window sash upward and to retain the window sash at a position selected by the user.

A known window balance assembly includes components of a carrier or "shoe", a curl spring, and a mounting bracket. One form of such a window balance assembly is referred to as a "moving coil" window balance. In such a window balance, a mounting bracket and carrier body can include mating features to enable the mounting bracket to attach to the carrier in an uninstalled, shipping configuration. A force of the curl spring acting on the mounting bracket also helps maintain engagement between the mounting bracket and the carrier in the shipping configuration. In one known assembly, the shipping configuration simplifies the installation process and avoids the need for the installer to assemble and align the various components of the window balance assembly.

After the window balance assembly is installed, the mounting bracket is fully disengaged from the carrier of the window balance assembly to place the window balance assembly in a working configuration. Disengagement of the mounting bracket from the carrier can be accomplished by articulating the carrier and/or mounting bracket to cause their respective mating features to detach from one another or by a material failure (e.g., a break, fracture, deformation or deflection) of the mounting bracket and/or the carrier due to forces acting on these components during the installation of the window balance assembly.

SUMMARY

A window balance assembly is provided that may include a carrier, a curl spring disposed in the carrier and having an uncurled end portion disposed outside the carrier and comprising a first aperture through the uncurled end portion and a second aperture through the uncurled end portion, and a mounting bracket. The mounting bracket can include attachment features for engaging the uncurled end portion of the curl spring to securely attach the mounting bracket to the curl spring so that the window balance may be configured as a complete assembly in an uninstalled, shipping condition.

In one example, a mounting bracket for a window balance assembly is provided that may include a body, a first hook and a second hook. The body may have a first planar surface, a second planar surface, a top edge, a bottom edge, a front edge, a rear edge, and an opening extending through the body. Both the first and second hooks may be configured to selectively engage the uncurled end portion of the curl spring of the window balance assembly.

The first hook may extend from the front edge of the body and include an upwardly projecting first distal end. The first distal end may be configured to selectively engage the first aperture of the uncurled end portion of the curl spring. The second hook can extend from the front edge of the body and include a downwardly projecting second distal end. The second distal end may be configured to selectively engage the second aperture of the uncurled end portion of the curl spring. Further, the first hook may have a first proximal end extending from the front edge of the body at a non-perpendicular angle and the second hook may have a second proximal end extending generally perpendicularly from the front edge.

In another example, a mounting bracket for a window balance assembly is provided that may include a channel-shaped body having a wall, a first side wall, and a second side wall, where the first and second side walls may be disposed opposite one another and extend perpendicularly from the wall. Each of the wall, first side wall, and second side wall may have an inside surface and an outside surface. The mounting bracket may further include one or more fingers extending from a rear surface of the wall, and each of the one or more fingers may be configured to selectively engage corresponding openings in a window jamb channel. Each of the one or more fingers may include a proximal portion extending perpendicularly away from the rear surface of the wall, a medial portion adjacent the proximal portion and comprising a downward bend, and a distal portion adjacent the medial portion and extending downwardly from the medial portion.

The mounting bracket may further include a first hook that extends from the first side wall and has an upwardly projecting first distal end, and a second hook that extends from the second side wall and comprises an upwardly projecting second distal end. Each of the first and second hooks may also be configured to selectively engage a curl spring and a carrier of the window balance assembly.

In yet another example, a mounting bracket for a window balance assembly is provided that includes a channel-shaped body having a back wall, a first side wall, and a second side wall. Each of the first side wall and the second side wall can have an open recess, a boss projecting from an inner wall of the open recess and a covered slot below the open recess. The boss can engage the uncurled end portion of the curl spring to connect the curl spring to the mounting bracket and the slot is operable to receive the uncurled end portion of the curl spring in the slot.

In addition, boss can be generally annularly shaped and have an outer face, a wall and a groove disposed in the wall and between the outer face and the inner wall of the open recess. The outer face of the boss can pass through an aperture in the uncurled end portion of the curl spring and the boss can engage an inside edge surface of the aperture.

Also, the back wall can include at least one opening through the back wall that can receive a fastener for attaching the mounting bracket to a window jamb channel.

The back wall can additionally have at least one spring finger extending rearward from the back wall that can engage an opening in a wall of a window jamb channel. The back wall may further include at least one opening and each of the at least one spring finger can be disposed within a corresponding one of the at least one opening. Each of the at least one spring finger may include a stationary portion, a living hinge, and a movable engagement portion. The living hinge can have an area of reduced thickness between the stationary portion and the movable engagement portion and the movable engagement portion may be pivotable relative to the stationary portion about the living hinge. The living hinge can provide a resistive biasing force tending to oppose pivotable movement of the movable engagement portion from a nominal position.

In still another example, a window balance assembly configured for installation in a jamb channel of a window frame is disclosed as including a carrier, a curl spring at least partially disposed in the carrier and having an uncurled end portion extending from the carrier, and a mounting bracket. The mounting bracket can have a C-shaped body having a back wall having a front surface, a rear surface and at least one engagement opening, a first side wall disposed adjacent to the back wall and extending perpendicularly to the back wall, and a second side wall disposed adjacent to the back wall and extending perpendicularly to the back wall, the first side wall and the second side wall opposing one another.

Each of the first side wall and the second side wall can have an inside face, an outside face, a front face, a top face, and a bottom face, the top face being disposed opposite to the bottom face, and the inside face being disposed opposite the outside face. The inside face of the first side wall can opposes the inside face of the second side wall. The rear surface of the back wall can be disposed opposite the front surface of the back wall, and the rear surface of the back wall can be disposed opposite the front faces of the first side wall and the second side wall. Each of the first side wall and the second side wall can have a recessed portion, a cover portion, and a slot.

The recessed portion can extend from an opening on the outside face toward the inside face and terminate at an inner recess surface. The recessed portion also opens to the front face. The slot can extend from the front face toward the rear surface and include an opening on the front face and an opening on the bottom face. The slot can be interconnected with the recessed portion. The cover portion can be a planar-shaped member that extends from the rear surface and covers the slot.

A boss can extend from the inner recess surface of the recessed portion toward the outside face and selectively engage the uncurled end portion of the curl spring. The slot can cover a portion of the uncurled end portion of the curl spring when the boss is engaged with the uncurled end portion of the curl spring.

The jamb channel can have a jamb wall and the back wall of the mounting bracket can be disposed adjacent to the jamb wall. At least one spring finger can be disposed on the jamb wall, the at least one spring finger able to selectively engage the at least one engagement opening in the back wall of the mounting bracket.

Additional installation features included on the mounting bracket may reduce an amount of additional hardware needed to secure the mounting bracket within a jamb channel. By reducing an amount of additional hardware needed for installing the window bracket, a builder, contractor, or installer may realize additional cost savings by shortening installation time and decreasing labor, as well as by foregoing the purchase of additional installation hardware, while also limiting the amount of additional hardware that the builder, contractor, or installer has to manage and keep track of.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 5A is a perspective view of the example mounting bracket shown in

FIG. 4A selectively disengaged from a curl spring;

FIG. 5B is a perspective view of the example mounting bracket shown in

FIG. 4A selectively engaged to the curl spring;

In the drawings, reference numbers may be reused to identify similar and/or identical elements.

DETAILED DESCRIPTION

Figure 1:
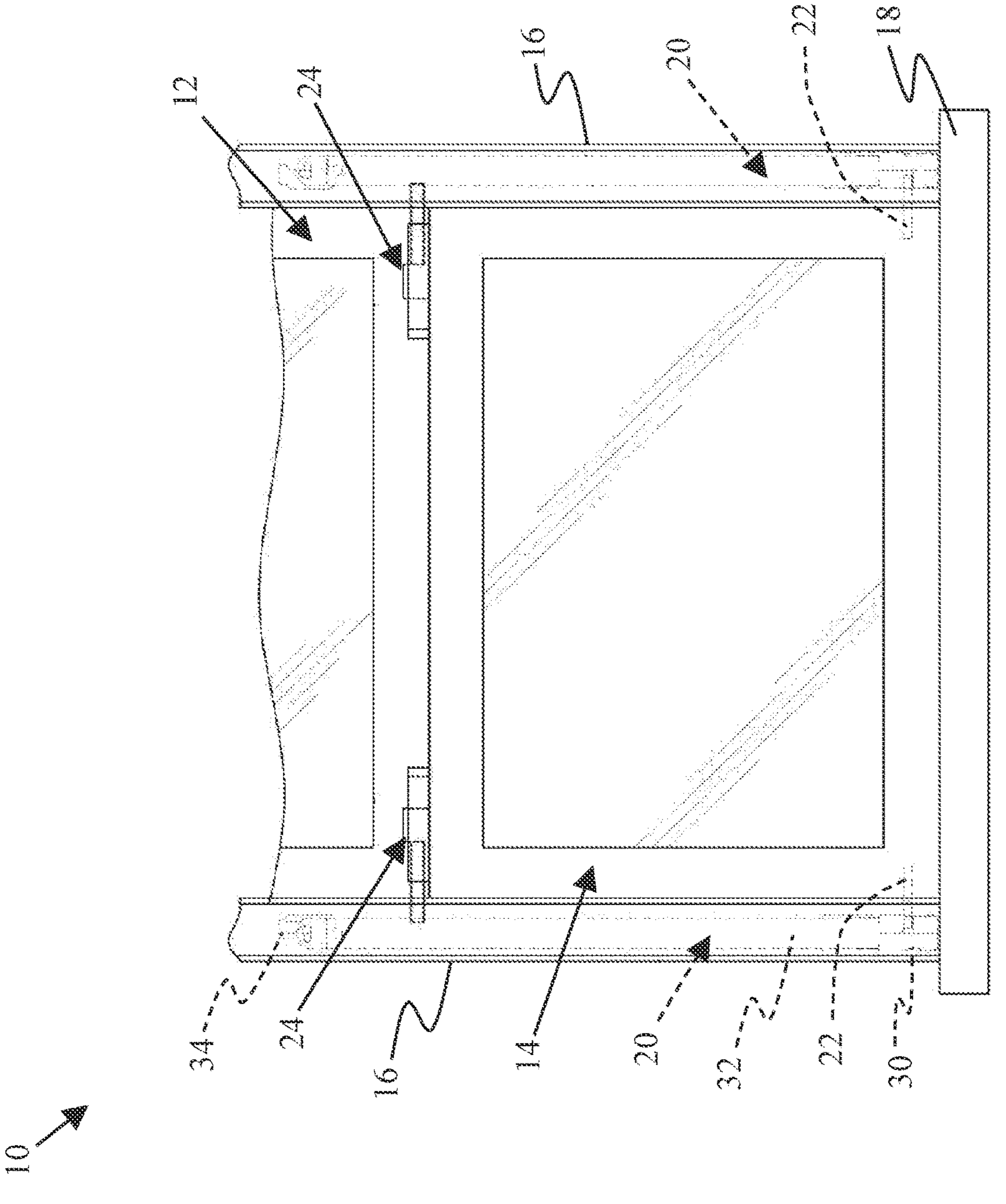
FIG. 1 is a front view of a window assembly including window balance assemblies according to the principles of the present disclosure.

With reference to FIG. 1, a window assembly 10 is provided that may include an upper sash 12, a lower sash 14, a pair of window jambs 16, a window sill 18, and two or more window balance assemblies 20. In the example embodiment illustrated in FIG. 1, the upper sash 12 is fixed relative to the window sill 18 in a single hung window assembly. However, in other example embodiments, the upper sash 12 may be movable relative to the window sill 18 between a raised or closed position and a lowered or open positon (i.e., in a double hung window assembly). The lower sash 14 may be raised and lowered between open and closed positions and may be connected to the window balance assemblies 20 which assist a user in opening the lower sash 14 and maintaining the lower sash 14 in a desired position relative to the window sill 18.

The lower sash 14 may include a pair of pivot bars 22 and a pair of tilt latch mechanisms 24. Each of the pivot bars 22 may extend laterally outward in opposing directions from a lower portion of the lower sash 14 and may engage one of the corresponding window balance assemblies 20. Each of the tilt latch mechanisms 24 may extend laterally outward in opposing directions from an upper portion of the lower sash 14 and may selectively engage one of the corresponding window jambs 16.

While not illustrated in FIG. 1, it will be appreciated that in a double hung window assembly, the upper sash 12 may also be connected to two or more window balance assemblies to assist the user in opening the upper sash 12 and to maintain the upper sash 12 in a selected position relative to the window sill 18. In such a window assembly, the upper sash 12 may also include tilt latches and pivot bars to allow the upper sash 12 to pivot relative to the window jambs 16 in the manner described above.

Figure 2B:
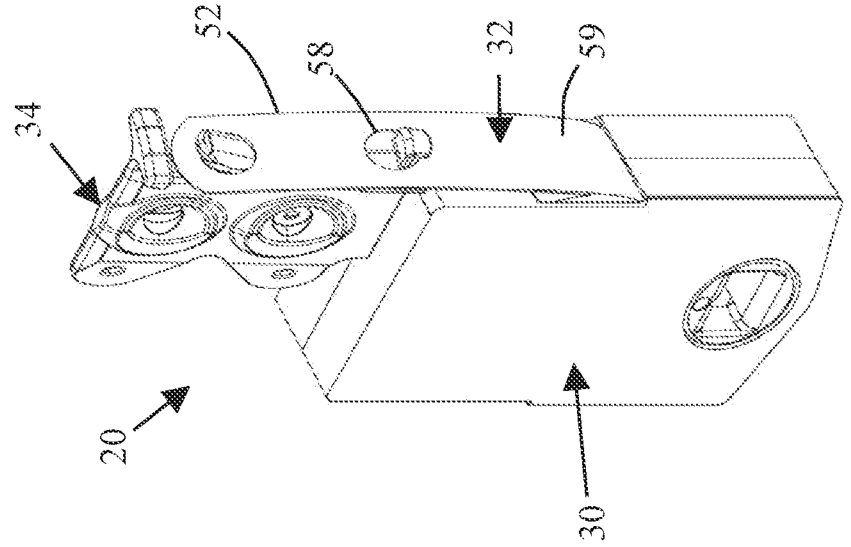
FIG. 2B is a perspective view of the example mounting bracket shown in FIG. 2A selectively engaged to the other components of the window balance assembly.
Figure 2A:
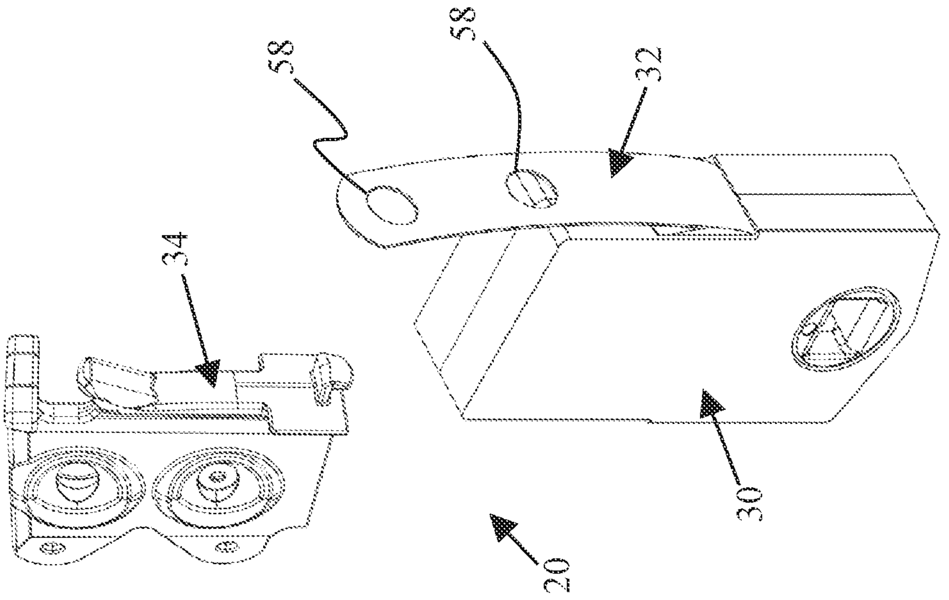
FIG. 2A is a perspective view of an example mounting bracket selectively disengaged from other components of a window balance assembly.

With reference to FIGS. 2A and 2B, an example window balance assembly 20 is illustrated. The window balance assembly 20 may include a carrier 30, a curl spring 32, and a mounting bracket 34. As shown in FIG. 2A, the mounting bracket 34 may be detached from the curl spring 32 of the window balance assembly 20. However, as shown in FIG. 2B, the window balance assembly may be initially assembled, packaged, and shipped in an uninstalled or shipping configuration with the mounting bracket 34 selectively engaged or attached to the curl spring 32 and the curl spring in a retracted or coiled state relative to the carrier 30. While the mounting bracket 34 may be selectively disengaged or detached from the curl spring 32, secure attachment/engagement features on the mounting bracket, described in greater detail below, allow the mounting bracket 34 to remain fixed to the curl spring 32 prior to installation so that the window balance assembly 20 including the carrier 30, the curl spring 32, and the mounting bracket 34 may be packaged, sold and handled as a unitary assembly.

Figure 3:
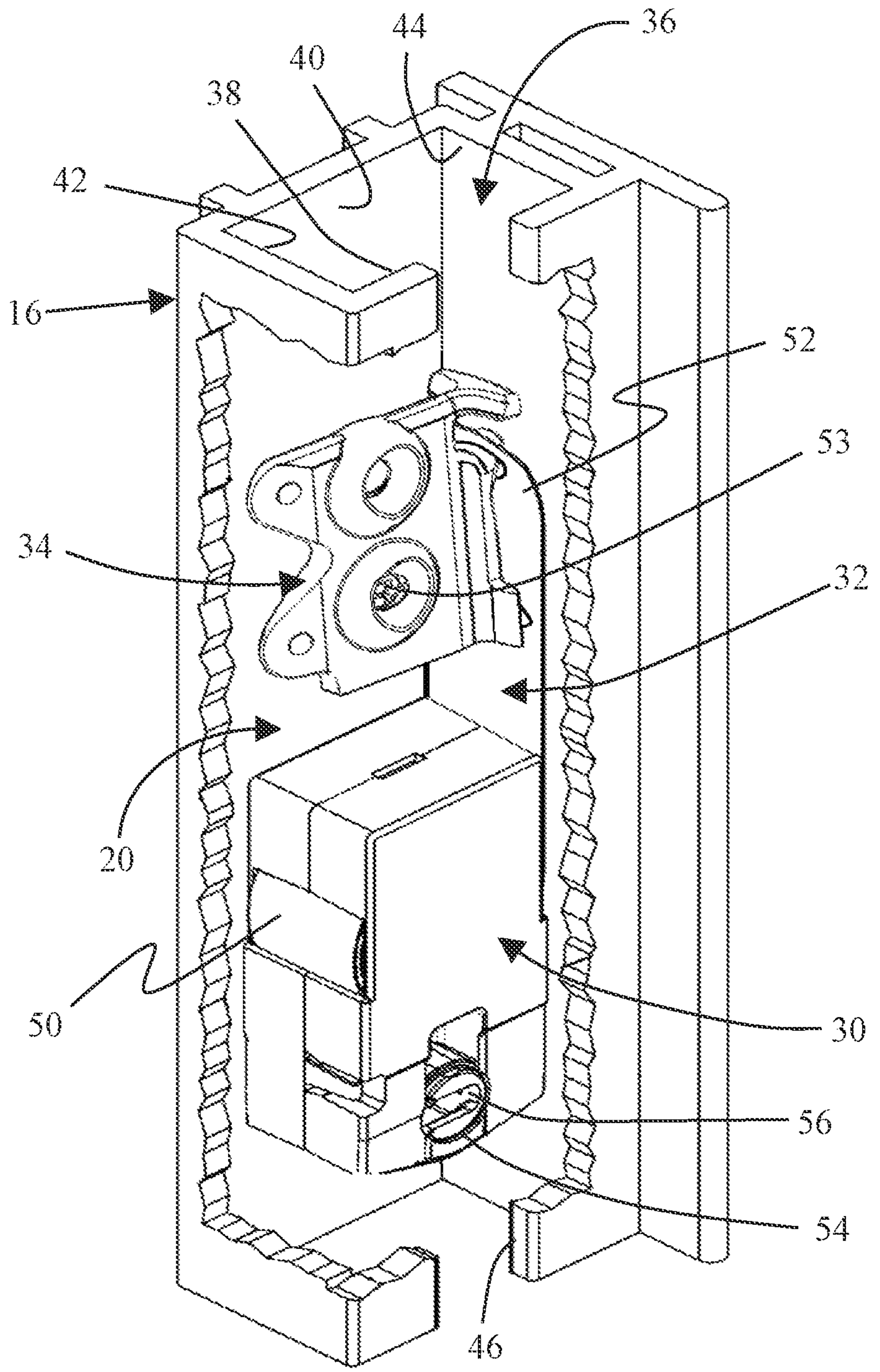
FIG. 3 is a cutaway view of a jamb channel illustrating an installation of the example mounting bracket and the other components of the window balance assembly shown in FIG. 2A.

Now referring to FIG. 3, the example window balance assembly 20 and a cutaway view of one of the window jambs 16 is shown. Each of the window jambs 16 may include a jamb channel 36 defined by a first wall 38, a second wall 40 that is opposite the first wall 38, and third and fourth walls 42, and 44 disposed perpendicular to the first and second walls 38, 40. The first wall 38 may include a vertically extending slot 46 that is adjacent to the lower sash 14. The window balance assembly 20 may be installed within the jamb channel 36. The pivot bar 22 of the window assembly 10 shown in FIG. 1 may extend through the slot 46 to engage the carrier 30 of the window balance assembly 20 within the jamb channel 36. The tilt latch mechanism 24 may also selectively engage the slot 46 to lock the lower sash 14 in an upright position, as shown in FIG. 1.

The carrier 30 (also referred to as a shoe) may engage the lower sash 14 (e.g., via the pivot bar 22) and house a curled portion 50 of the curl spring 32. The mounting bracket 34 may engage an uncurled end portion 52 of the curl spring 32 and the mounting bracket 34 may be fixed relative to the window jamb 16. For example, as shown in FIG. 3, the mounting bracket 34 may be attached to the second wall 40 of the jamb channel 36 by a mechanical fastener such as a screw 53.

With the window balance assembly attached to the lower sash 14 and the second wall 40 of the jamb channel, for example, as described above and illustrated in FIGS. 1 and 3, the curl spring 32 may resist being uncurled such that the curl spring 32 exerts an upward force on the carrier 30 to bias the lower sash 14 upward toward an open position.

The carrier 30 may include a receiver 54 that has a slotted recess 56. The slotted recess 56 can receive the pivot bar 22 on the lower sash 14 of the window assembly 10, as shown in FIG. 1. In this manner, the engagement of the pivot bar 22 to the receiver 54 on the carrier 30 forms a mechanical connection between the carrier 30 and the lower sash 14 so that the carrier 30 moves within the jamb channel 36 relative to the movement of the lower sash 14, as the lower sash 14 moves between open and closed positions.

With reference again to FIGS. 2A and 2B, the curl spring 32 may include one or more apertures 58 disposed near the uncurled end portion 52. The apertures 58, or more specifically the inside surfaces that bound and define the apertures 58, may engage features on the mounting bracket 34 to mechanically connect or fasten the curl spring 32 to the mounting bracket 34. The curl spring 32 also has a front surface 59 that is oriented to face away from the mounting bracket 34 when the curl spring 32 is engaged to the mounting bracket 34.

Figure 4B:
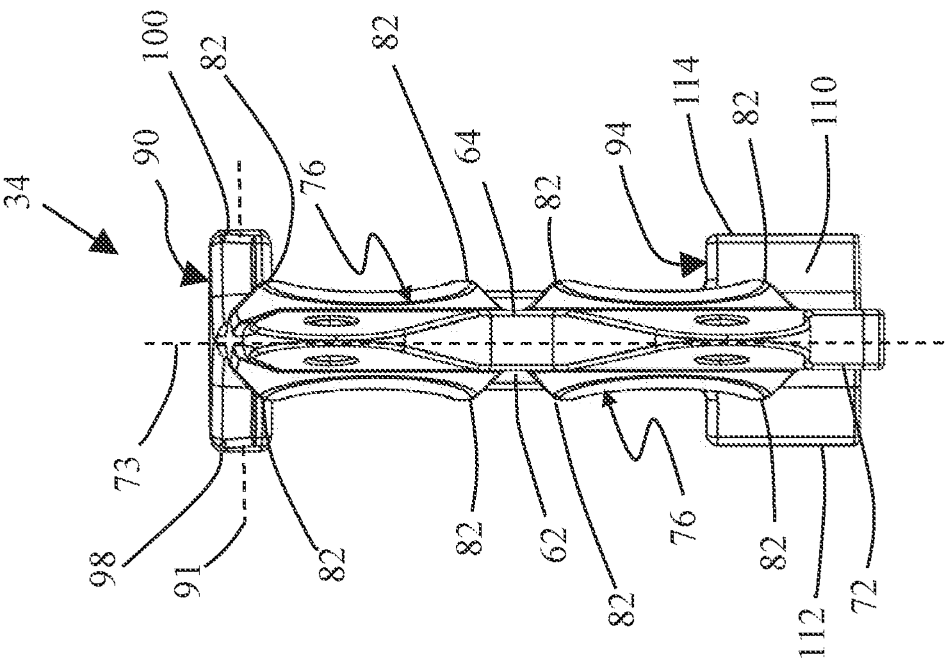
FIG. 4B is a rear view of the example mounting bracket shown in FIG. 4A.
Figure 4A:
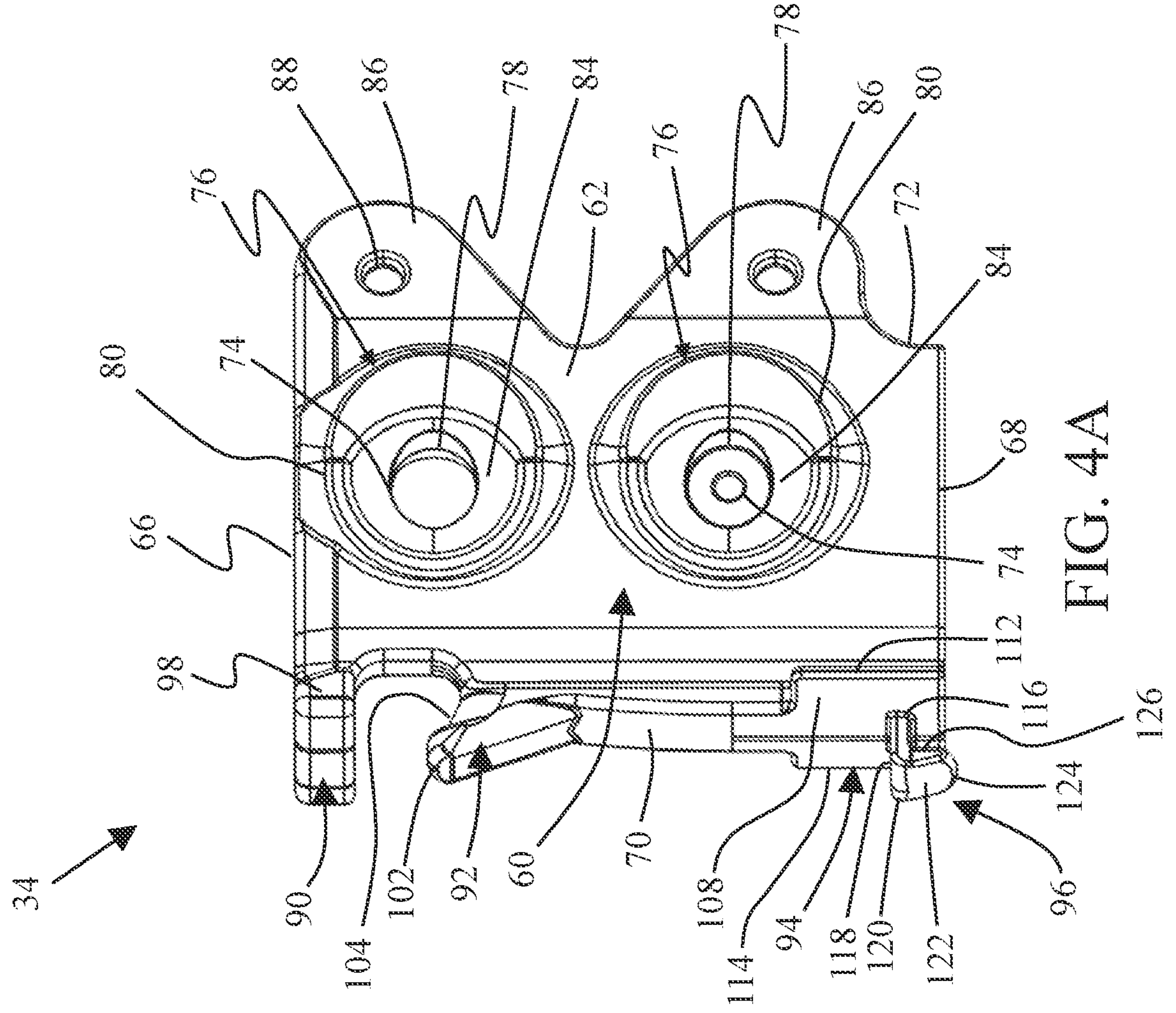
FIG. 4A is a perspective view of an example mounting bracket.

Now referring to FIGS. 4A and 4B, one example embodiment of the mounting bracket 34 is illustrated. The mounting bracket 34 may be formed, for example, from a polymeric material such as plastic. The mounting bracket 34 may also be formed of a metal or alloy such as aluminum or steel.

The mounting bracket 34 may include a planar-shaped body portion 60 having a first surface 62 and a second surface 64, where the first surface 62 and the second surface 64 are disposed opposite one another. The body portion 60 may further include a top edge 66, bottom edge 68, front edge 70, and a rear edge 72, where the edges 66, 68, 70, 72 are disposed between the first and second surfaces 62, 64 and around a perimeter of the body portion 60.

From the rear view of the mounting bracket 34 in FIG. 4B, the mounting bracket 34 may be symmetrical. That is, a medial plane including the longitudinal axis 73 of the mounting bracket 34 may bisect the mounting bracket 34 into two symmetrical halves. As such, the mounting bracket 34 may be used interchangeably in either of a left or right window jamb 16 in the window assembly 10 shown in FIG. 1.

The body portion 60 may also include one or more openings 74 with a boss portion 76 surrounding each of the openings 74.

Figure 6:
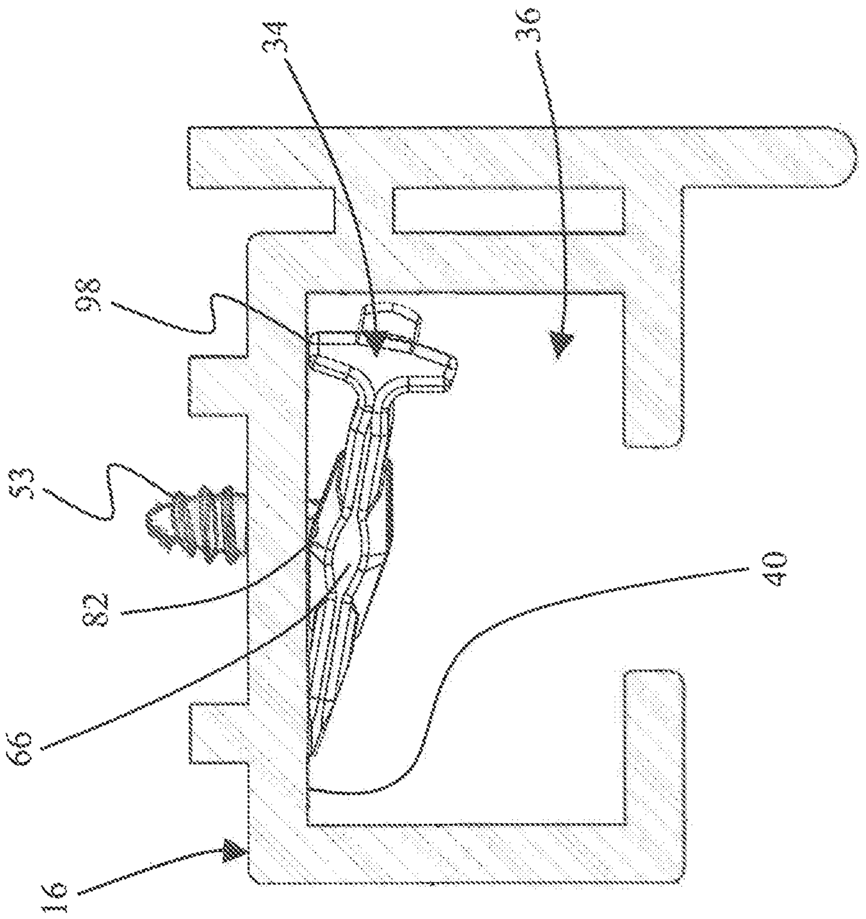
FIG. 6 is a top view of the example mounting bracket shown in FIG. 4A attached within a jamb channel.

As shown in FIG. 4A, the openings 74 may be circular in shape and extend through the body portion 60 from the first surface 62 to the second surface 64. The openings 74 may be used to secure the mounting bracket 34 within the jamb channel 36. More specifically, a shank portion of a mechanical fastener such as a screw 53, as shown in FIGS. 3 and 6, or a nail may pass through the opening 74 to secure the mounting bracket 34 to a wall of the jamb channel 36.

The opening 74 may have a countersink 78, counterbore, or other cylindrical- or conical-shaped chamfer portion surrounding the opening 74. For example, as shown in FIG. 4A, the countersink portion 78 may be formed around the opening 74. The countersink portion 78 may be used to position a head of a mechanical faster such as screw 53 to be flush within the opening 74 when the mounting bracket 34 is secured to a wall within the jamb channel 36. Alternatively, or in addition to, the counter sink portion 78 may be oriented at a certain angle relative to the opening 74 so as to direct an installation angle of the screw 53 when the mounting bracket 34 is secured within the jamb channel 36. The counter sink portion 78 may orient the shank of the screw 53 to be normal (i.e., perpendicular) relative to the first and second surfaces 62, 64 of the body portion 60, for example, as shown in FIG. 6. Alternatively, the countersink portion 78 may orient the screw 53 to be normal to a wall within the jamb channel 36 to which the mounting bracket 34 is attached.

As shown in FIGS. 4A and 4B, a bowl-shaped boss portion 76 surrounds the opening 74. A circumferential edge 80 of the boss portion 76 includes contact points or bearing surfaces 82. The contact points 82, as shown in FIG. 4B, are raised portions that extend laterally away from, and in a direction perpendicular to, the first and second surfaces 62, 64. The contact points 82 of the boss portion 76 may be one of several points or surfaces on the mounting bracket 34 that contact a wall of the jamb channel 36 when the mounting bracket 34 is secured to the wall of the jamb channel 36. As shown in FIG. 4A, the opening 74 may be disposed centrally within a depression 84 of the bowl-shaped boss portion 76.

The body portion 60 may also include one or more tabs 86 extending from the rear edge 72. Each of the tabs 86 may include an opening 88 that extends through the tab from the first surface 62 to the second surface 64.

The mounting bracket 34 may further include a head portion 90, a first hook or latch 92, a foot portion 94, and a second hook or latch 96.

As shown in FIG. 4A, the head portion 90 extends from the front edge 70 of the mounting bracket 34 near the top edge 66. The head portion 90 may be an elongated shape such as a polyhedron, cylinder, or another three-dimensional shape having straight and/or curved edges. A longitudinal axis 91 of the head portion 90 extends in a direction lateral to the body portion 60 relative to the first and second surfaces 62, 64—that is, in directions perpendicular to the planes of the first and second surfaces 62, 64. For example, as shown in FIGS. 4A and 4B, the head portion 90 may be a hammer-head shape that extends laterally in a direction away from, and perpendicular to, the planes of the first and second surfaces 62, 64.

The head portion 90 may also include a first side face 98 and a second side face 100. The first side face 98 may be disposed at one end of the head portion 90 (i.e., relative to the longitudinal axis 91 of the head portion 90) and the second side face 100 may be disposed at an opposite end of the head portion 90. The first side face 98 may be oriented to face in the same direction as the first surface 62 such that the plane including the first side face 98 is parallel to the plane including the first surface 62. Likewise, the second side face 100 may be oriented to face in the same direction as the second surface 64.

The width of the head portion 90, as measured from the first side face 98 to the second side face 100, may be greater than the thickness of the body portion 60, as measured from the first surface 62 to the second surface 64, for example, as shown in FIG. 4B. The width of the head portion 90 may even be greater than a distance between corresponding contact points 82 of the boss portions 76 on the first surface 62 and the second surface 64 of the body portion 60. As such, the first or second side faces 98 and 100 may be in contact with the wall of the jamb channel 36 to which the mounting bracket is attached. Similar to the contact points 82 of the boss portions 76, all or part of the first side face 98 or second side face 100 may contact a wall of the jamb channel 36 when the mounting bracket 34 is secured to the wall of the jamb channel 36, for example, as shown in FIG. 6. Because the distance from a side face (e.g. the side face 98) to the line 73 is greater than the distance from the contact point 82 to the line 73, the mounting bracket may be angled relative to a wall to which the mounting bracket 34 is attached, for example, as shown in FIG. 6.

Figure 5B:
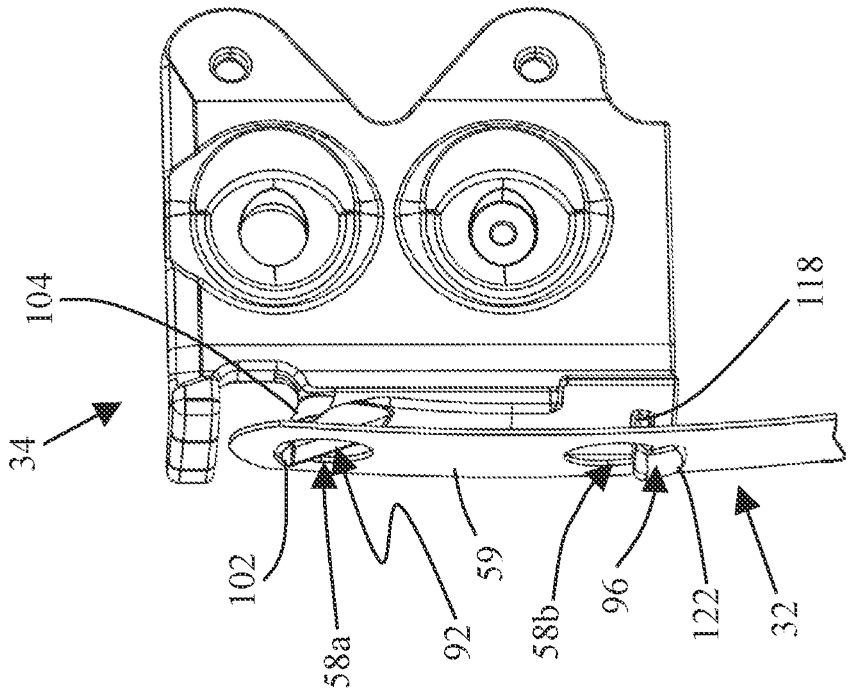
Figure 5A:
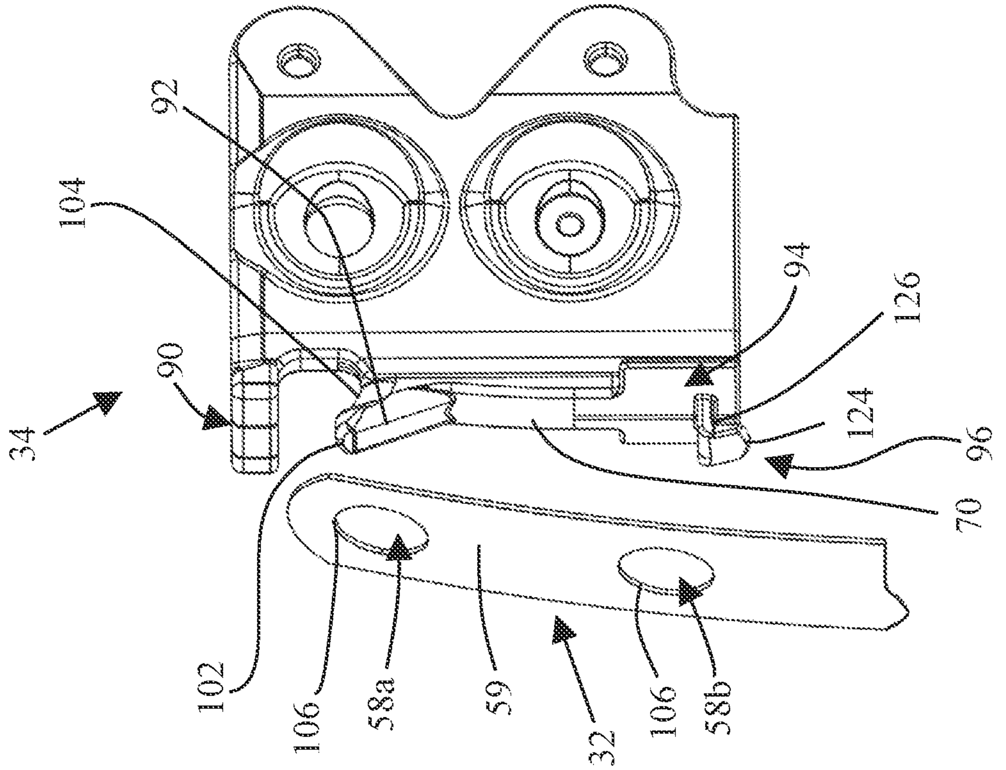

With reference now to FIGS. 4A, 5A, and 5B, the first hook or latch 92 extends from the front edge 70 of the body portion 60 and is disposed under the head portion 90. The first hook 92 extends away from the front edge 60 toward the head portion 90 so that a distal end 102 and a surface 104 of the first hook 92 are oriented upwards, as shown in the drawings.

The curl spring 32 shown in FIGS. 5A and 5B is a cutaway portion of the curl spring 32 described and illustrated, for example, with respect to FIGS. 2A, 2B, and 3. That is, the entirety of the curl spring 32 is not shown in FIGS. 5A and 5B. The first hook may be used to engage an aperture 58*a* on the curl spring 32 such that an inside edge surface 106 of the aperture 58*a* contacts the surface 104 of the first hook 92 to secure the curl spring 32 to the mounting bracket 34. A portion of the surface 104 of the first hook 92 may also contact a portion of the front surface 59 of the curl spring 32. For example, as shown in FIGS. 5A and 5B, the distal end 102 of the first hook 92 can be passed through the aperture 58*a* of the curl spring 32 so that a portion of the inside edge surface 106 of the aperture 58*a* and a portion of the front surface 59 of the curl spring 32 contact the surface 104 of the first hook 92. When the mounting bracket 34 is secured within the jamb channel 36 and the curl spring 32 is engaged to the mounting bracket 34, the spring force acting on the curl spring 32 acts on the surface 104 of the first hook 92 to maintain the engagement of the curl spring 32 to the mounting bracket. That is, the tension between the curl spring 32 and the first hook 92 of the mounting bracket 34 helps to maintain the engagement of the curl spring 32 to the surface 104 of the first hook 92.

With reference again to FIGS. 4A and 4B, the mounting bracket may further include a foot portion 94 near the bottom of the front edge 70. The foot portion 94 may be a planar-shaped member that extends laterally in a direction away from, and perpendicular to, the respective planes including the first and second surfaces 62, 64. The foot portion 94 may have a first surface 108 oriented to face away from the front edge 70 of the mounting bracket body portion 60 and a second surface 110 opposite the first surface 108 and oriented to face toward the front edge 70. The foot portion 94 may also include a first side edge 112 and a second side edge 114. The second hook or latch 96 extends from the first surface 108 of the foot portion 94.

The first and second side edges 112, 114 may be disposed at the lateral sides of the first and second surfaces 108, 110 to interconnect the first and second surfaces 108, 110. The first side edge 112 may be oriented to face in the same direction as the first surface 62 of the body portion 60. Likewise, the second side edge 114 may be oriented to face in the same direction as the second surface 64.

Like the head portion 90, the width of the foot portion 94, as measured from the first side edge 112 to the second side edge 114, may be greater than the thickness of the body portion 60. The foot portion 94 may be the same width as the head portion 90. As such, the first side edge 112 or the second side edge 114 may contact a wall of the jamb channel 36 when the mounting bracket 34 is affixed to the wall of the jamb channel 36.

With reference now to FIG. 6, a cross-sectional view showing the top of the mounting bracket 34 installed in the jamb channel 36 is illustrated. As shown in FIG. 6, the first side face 98 of the head portion 90 and the contact point 82 near the top edge 66 of the first surface 62 of the body portion 60 are shown contacting the second wall 40 of the jamb channel 36.

With reference again to FIGS. 4A, 5A, and 5B, the second hook 96 may extend away from the first surface 108 of the foot portion 94 before bending downward. More specifically, the second hook 96 may include a proximal end 116, a laterally-extending portion 118, a right-angle-downward bend 120, a downward-extending portion 122, a distal end 124, and a surface 126. Starting at the proximal end 116 where the second hook 96 begins to extend from the first surface 108 of the foot portion 94, the laterally-extending portion 118 may extend in a perpendicular or non-perpendicular direction and away from the first surface 108 before reaching a downward bend 120. The downward-extending portion 122 may then extend from the downward bend 120 in a downward direction before terminating at the distal end 124. The surface 126 of the second hook 96 may extend from the proximal end 116 to the distal end 124. Similar to the engagement of the first hook 92 to the aperture 58*a*, the surface 126 of the second hook 96 may engage the inside edge surface 106 of the aperture 58*b* and a front surface 59 of the curl spring 32.

To connect the curl spring 32 to the mounting bracket 34, the distal end 102 of the first hook 92 may be inserted through the upper aperture 58*a* of the curl spring 32 so that the surface 104 of the first hook 92 engages an inside edge surface 106 of the upper aperture 58*a*, for example, as shown in FIG. 5B. The distal end 124 of the second hook 96 may then be inserted through the lower aperture 58*b* of the curl spring 32, whereby an inside edge surface 106 of the aperture 58*b* on the curl spring 32 contacts the surface 126 of the second hook 96.

The first and second hooks 92 and 96 of the mounting bracket 34 may facilitate a secure mechanical engagement/attachment of the mounting bracket 34 to the curl spring 32 of the window balance assembly 20 so that the window balance assembly 20 can be marketed and sold as a single-package assembly (including the carrier 30, the curl spring 32, and the mounting bracket 34) to limit and/or prevent having to stock, supply and manage the individual component parts for the window balance. While the mounting bracket 34 of the window balance assembly 20 of the current embodiment may be selectively disengaged from the curl spring 32 by a builder, contractor, or installer, the packaging, marketing, and sale of the window balance assembly 20 with a secure engagement between the curl spring 32 and the mounting bracket 34 may provide a mounting bracket that is less likely to become detached during shipping or installation. The single-package assembly also allows an installer to purchase a complete, unitary window balance assembly without having to source or handle the individual component parts prior to installation.

With reference now to FIG. 1 5B, the inside edge surface 106 of the upper aperture 58*a* engages surface 104 of the first hook 92. To limit and/or prevent disengagement between the first hook 92 and the aperture 58*a*, the laterally-extending portion 118 of the second hook 96 may contact an inside edge surface 106 of the lower aperture 58*b* to limit movement of the upper aperture 58*a* relative to the first hook 92 and limit and/or prevent the disengagement of the upper aperture 58*a* from the first hook 92.

The downward-extending portion 122 of the second hook 96 may similarly prevent disengagement between the lower aperture 58*b* of the curl spring 32 and the second hook 96 of the bracket 34 by limiting movement of the lower aperture 58*b* to between the proximal end 116 and the downward bend 120 of the second hook. That is, the surface 126 of the second hook 96 on the downward-extending portion 122 may contact the front surface 59 of the curl spring 32 to limit and/or prevent disengagement of the lower aperture 58*b* from the second hook 96.

In addition to the bend directions and features of the first and second hooks 92, 96 to maintain the engagement of the mounting bracket 34 to the curl spring 32, it will be appreciated that the distances between the surfaces 104, 126 of the respective first and second hooks 92, 96 on the example mounting bracket 34 of the current embodiment can be matched to corresponding distances between the inside edge surfaces 106 of the upper and lower apertures 58*a*, 58*b* so as to further limit play between the upper and lower apertures 58*a*, 58*b* and the first and second hooks 92, 96, respectively, and to better maintain the engagement between the curl spring 32 and the mounting bracket 34.

With reference now to FIGS. 7A, 7B, 7C, and 7D, another example mounting bracket 234 is provided. The mounting bracket 234 may be used in place of the mounting bracket 34 in the window balance assembly 20. That is, the mounting bracket 234 may be used with the carrier 30 and the curl spring 32, as described above with reference to the previous example embodiment.

The mounting bracket 234 may be formed, for example, from a polymeric material such as plastic. The mounting bracket 234 may also be formed of a metal or alloy such as aluminum or steel.

The mounting bracket 234 may have a C-shaped channel body 236 that includes a first wall 238, a second wall 240, and a third wall 242. The second and third walls 240, 242 may be parallel to each other, as well as being perpendicular to the first wall 238. The mounting bracket 234 may be symmetrical about line 244. The line 244 may also indicate the longitudinal axis of the mounting bracket 234.

The first wall 238 may have a first or inside surface 246 oriented toward an inside of the C-shaped channel body 236. The first wall 238 may have a second or outside surface 248 oriented away from the C-shaped channel body 236, where the outside surface 248 is disposed opposite the inside surface 246 on the first wall 238. The first wall 238 may include a pair of slots 250 and a pair of hooks or fingers 252 that extend from the outside surface 248.

Figure 7B:
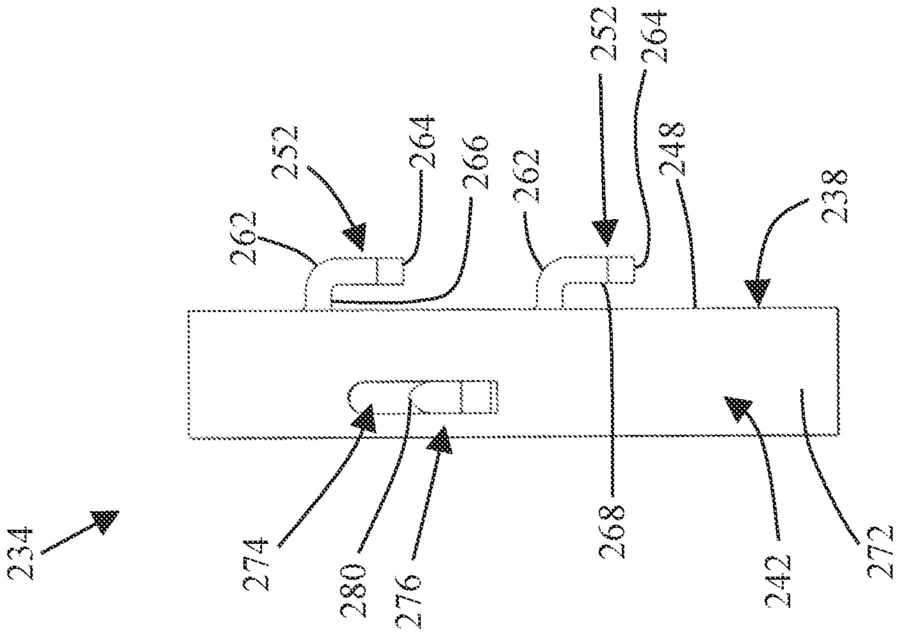
FIG. 7B is a side view of the example mounting bracket shown in FIG. 7A.
Figure 7A:
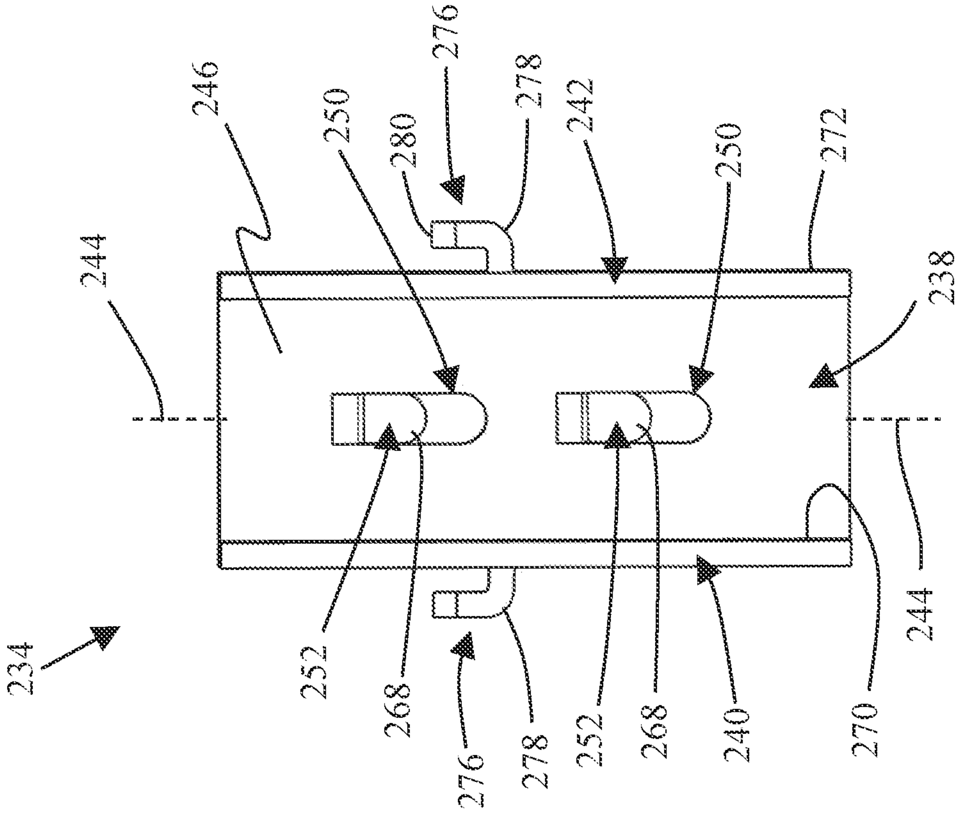
FIG. 7A is a front view of another example mounting bracket.
Figure 7D:
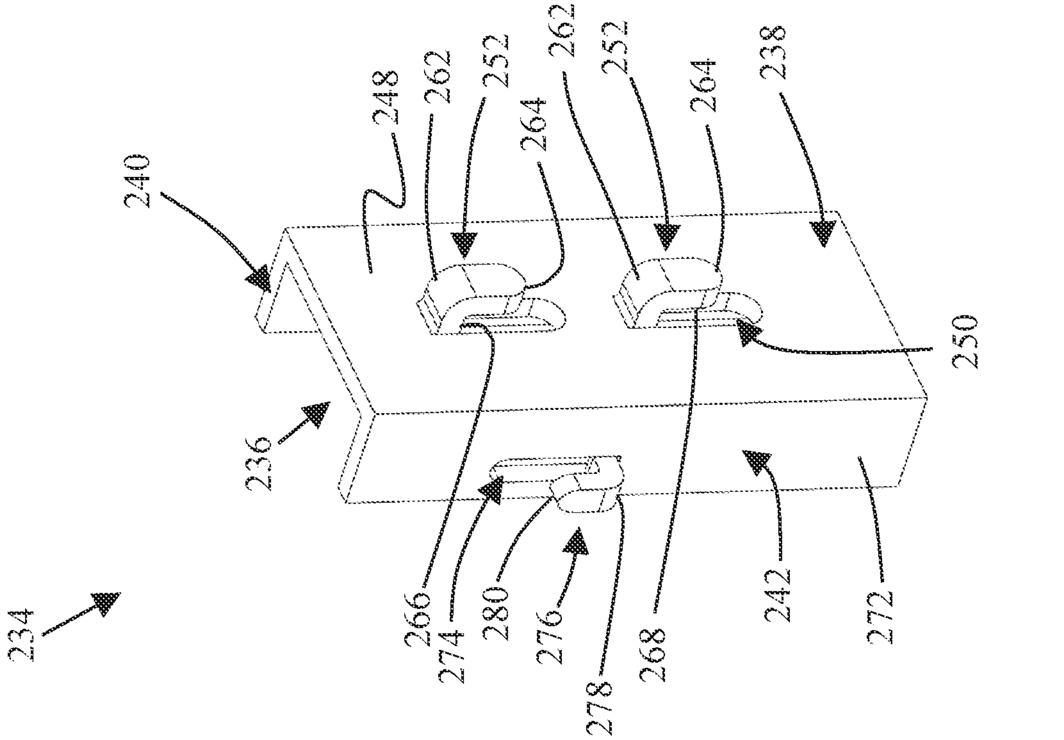
FIG. 7D is a rear perspective view of the example mounting bracket shown in FIG. 7A.
Figure 7C:
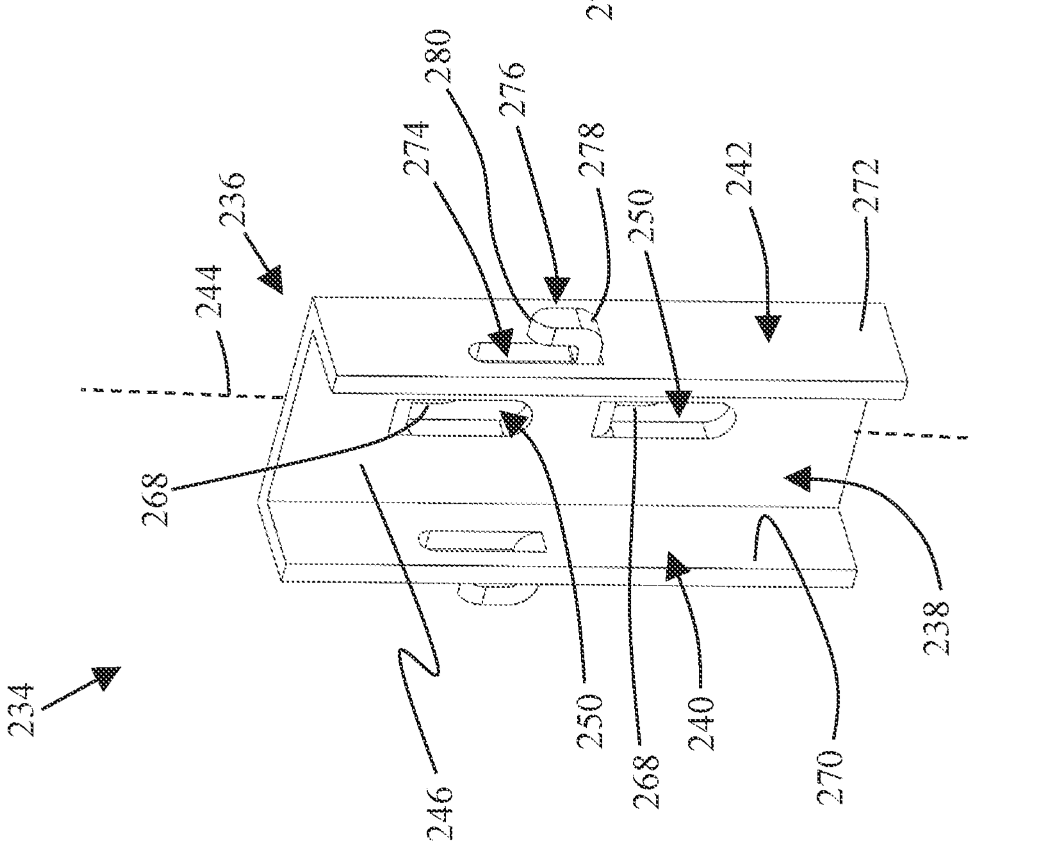
FIG. 7C is a front perspective view of the example mounting bracket shown in FIG. 7A.

Each of the slots 250 is shown as disposed centrally on the first wall 238 along the line 244 and in a vertical arrangement with one of the slots 250 being disposed above the other of the slots 250. Each of the slots 250 is an elongated opening that extends from the inside surface 246 to the outside surface 248 of the first wall 238. The slots 250 may be rectangular in shape with a semicircle at one end, as shown in FIGS. 7A, 7C, and 7D. The slots 250 may be similar in shape to the fingers 252. During an installation of the mounting bracket 234, the slots 250 may allow an installer to see through the slots from the inside surface 246 to see features in a jamb channel for engaging the mounting bracket 234.

A finger 252 is formed near the top of each of the slots 250 on the outside surface 248 of the first wall 238. The fingers 252 may be used to engage slotted features in a jamb channel to mount the mounting bracket 234 within the jamb channel.

Figure 8B:
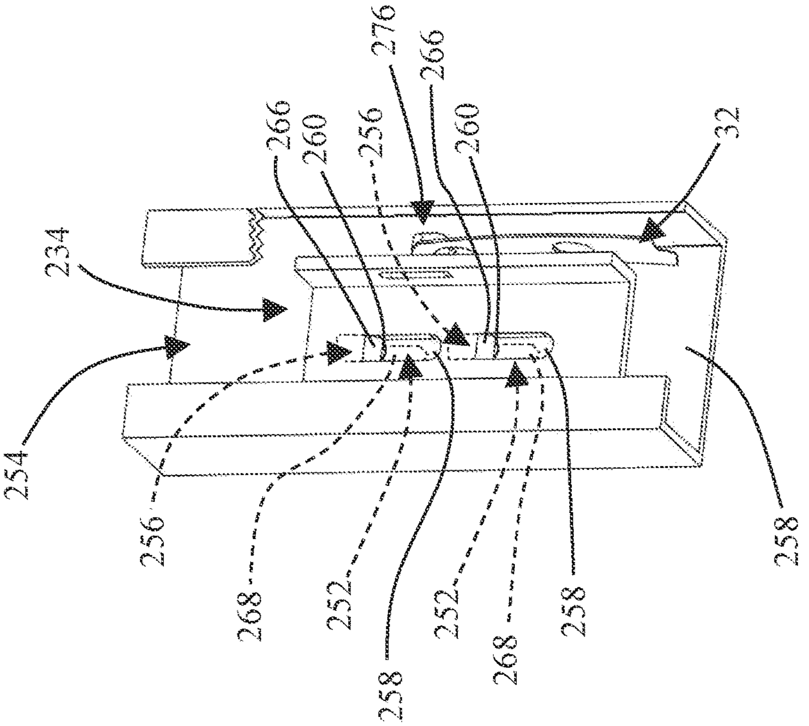
FIG. 8B illustrates an installation of the example mounting bracket shown in FIG. 7A to the jamb channel shown in FIG. 8A.
Figure 8A:
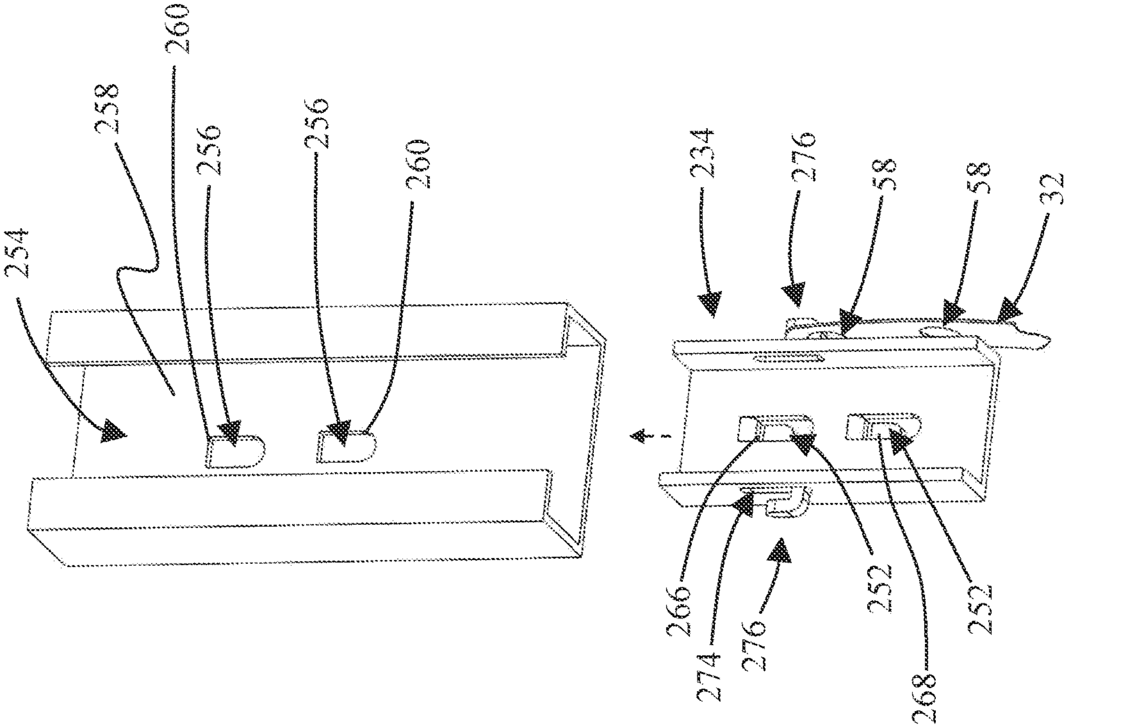
FIG. 8A illustrates a jamb channel for installing the example mounting bracket shown in FIG. 7A.
Figure 9B:
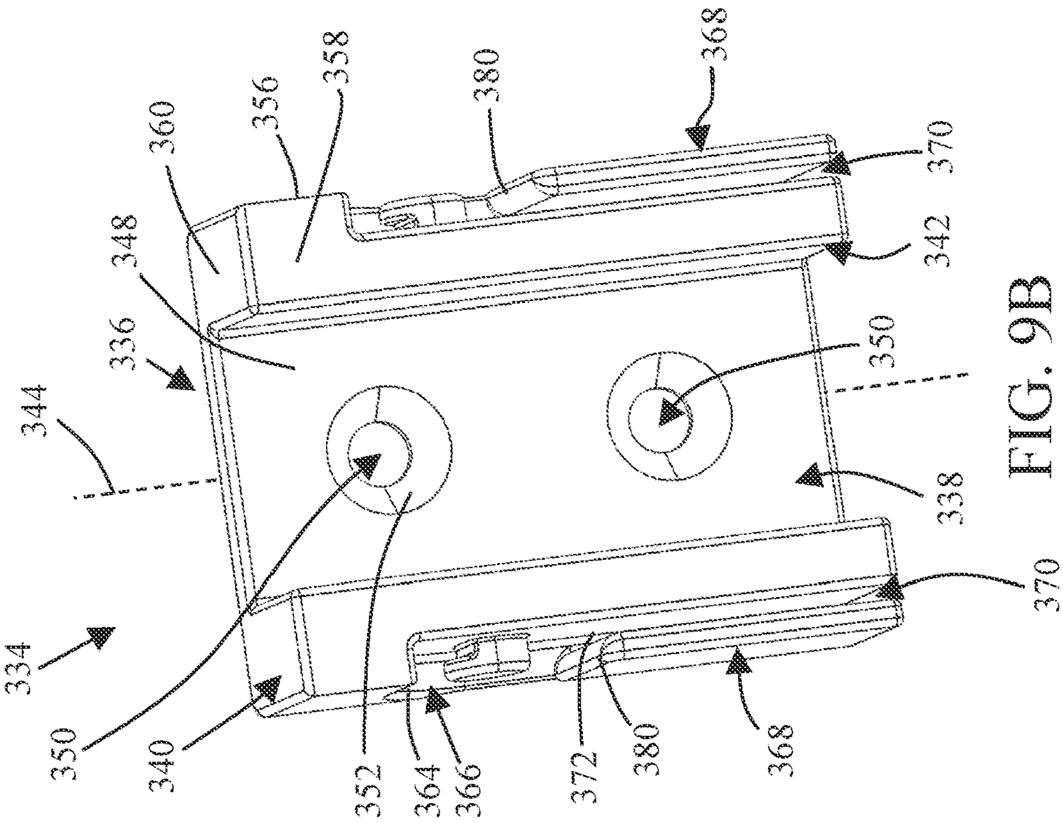
FIG. 9B is another perspective view of the example mounting bracket shown in FIG. 9A.
Figure 9A:
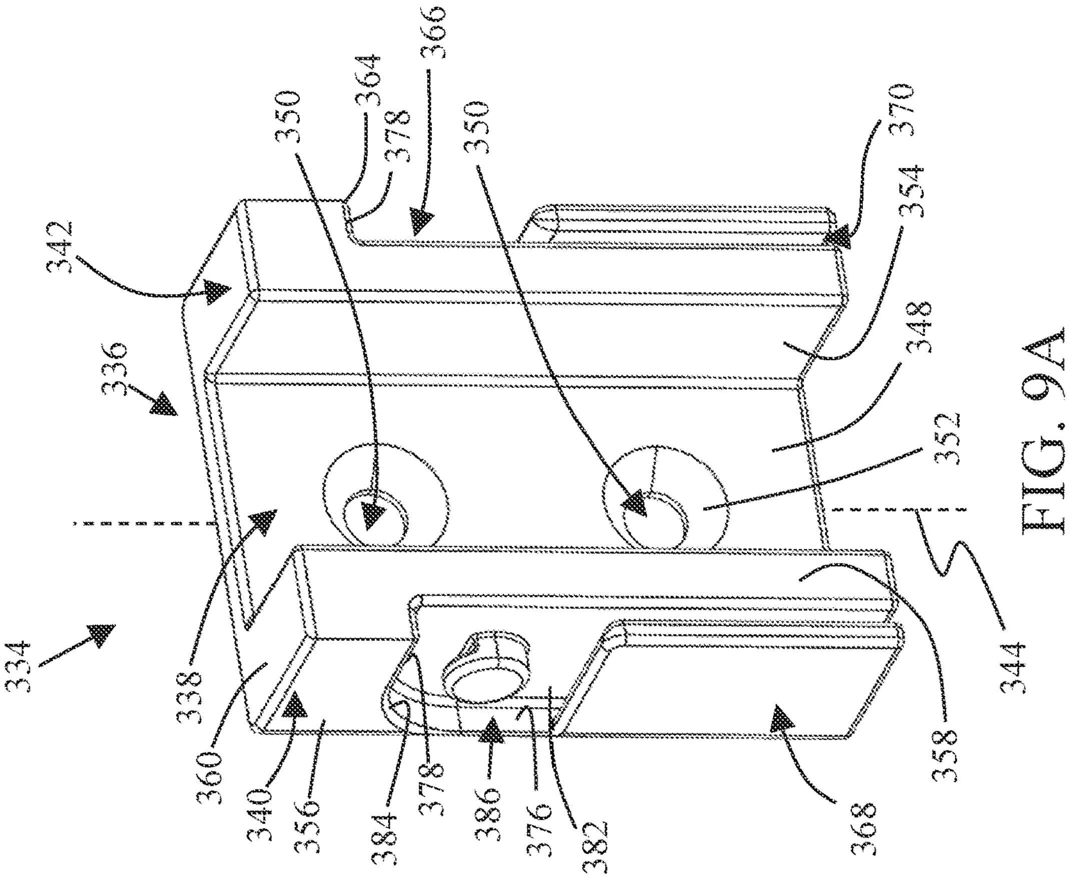
FIG. 9A is a perspective view of yet another example mounting bracket.
Figure 9D:
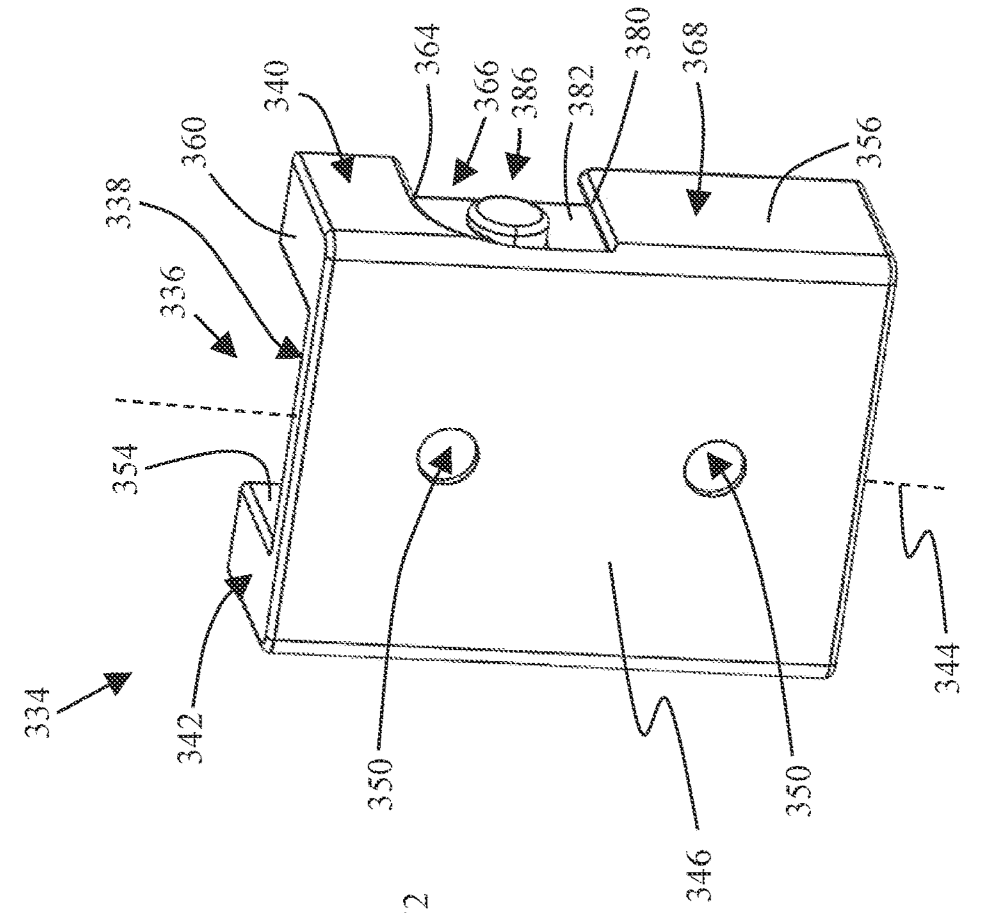
FIG. 9D is yet another perspective view of the example mounting bracket shown in FIG. 9A.
Figure 9C:
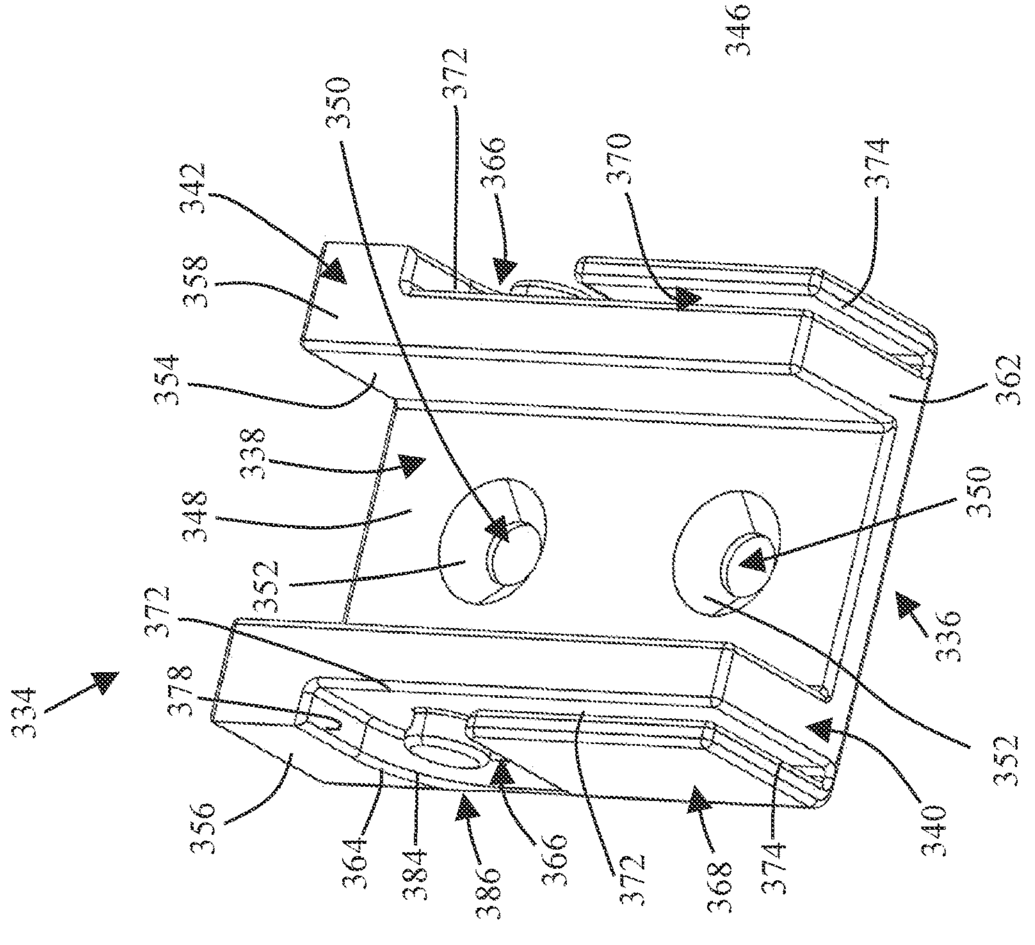
FIG. 9C is yet another perspective view of the example mounting bracket shown in FIG. 9A.

With reference now to FIGS. 8A and 8B, the mounting bracket 234 engaged to a portion of the curl spring 32 is shown, in addition to a jamb channel 254. The curl spring 32 shown in FIGS. 8A and 8B is a cutaway portion of the curl spring 32 described and illustrated in the previous embodiment and is not shown in complete detail.

The jamb channel 254 may be similar to the jamb channel 36 described and illustrated with respect to the previous example embodiment. However, the jamb channel 254 may include a pair of slotted engagement openings 256 on a wall 258 for engaging the fingers 252 on the mounting bracket 234. More specifically, the slotted engagement openings 256 allow the fingers 252 to engage an edge 260 surrounding each of the slotted engagement openings 256 and the wall 258 to affix the mounting bracket 234 within the jamb channel 254.

With reference again to FIGS. 7A-7D, the fingers 252 may extend perpendicularly from the outside surface 248 and then bend downward at bend 262 before extending further downward and terminating at a distal end 264.

An inside surface of the finger 252 between the outside surface 248 and the bend 262 may be a horizontal engagement portion 266 for engaging the edge 260 of the slotted engagement openings 256 in the jamb channel 254 to maintain a vertical position of the mounting bracket 234 within the jamb channel 254. An inside surface of the finger 252 between the bend 262 and the distal end 264 may be a vertical engagement portion 268 that contacts a surface of the wall 258 underneath the slotted engagement openings 256 to prevent the mounting bracket 234 from disengaging from the jamb channel 254 once the horizontal engagement portion 266 engages the edge 260 of the slotted engagement openings 256.

Since the mounting bracket 234 is symmetrical about the line 244, the mounting bracket 234 may be used interchangeably on either of a left or right window jamb, for example, the left and right window jambs 16 of the window assembly 10 shown in FIG. 1. Consequently, the second wall 240 and the third wall 242 may be symmetrical to one another. As such, the description of the second and third walls 240, 242 includes features common to both walls 240, 242

The second and third walls 240, 242 have a first or inside surface 270 and a second or outside surface 272. Each of the second and third walls 240, 242 may have a slotted opening 274 and a hook 276.

The slotted opening 274 is an elongated opening that extends through the inside surface 270 to the outside surface 272. The slotted opening 274 may be used by an installer to view from the inside surface 270 to the outside surface 272 of the mounting bracket, for example, to confirm engagement of the curl spring 32 to the hook 276 when the mounting bracket 234 is installed in the jamb channel 254.

The hook 276 extends near the bottom of the slotted opening 274 on the outside surface 272. The hook extends perpendicularly to the outside surface 272 before bending upward at a bend 278 and extending further upward until terminating at a distal end 280. The hook 276 may be used to engage one of the apertures 58 on the curl spring 32 to connect the mounting bracket 234 to the curl spring 32 of a window balance assembly. That is, the distal end 280 and the bend 278 of the hook 276 may pass through the aperture 58 on the curl spring 32 so that an inside surface of the hook 276 engages an inside edge surface of the aperture 58 on the curl spring 32 to engage the curl spring 32 to the hook 276 of the mounting bracket 234.

With reference again to FIGS. 8A and 8B, once the curl spring 32 is engaged to the mounting bracket 234, an installer may move the mounting bracket 234 into the jamb channel 254 (as indicated by the dashed arrow in FIG. 8A) and then up or down along the wall 258 until the fingers 252 mate with, and pass through, the slotted engagement openings 256. Once the fingers 252 pass through the slotted engagement openings 256, an installer may then move the mounting bracket 234 downward to engage the horizontal engagement portion 266 of the fingers 252 with the edge 260 of the slotted engagement openings 256 and engage the vertical engagement portions 268 with the wall 258, as shown in FIG. 8B.

It will be appreciated that the configuration and orientation of the slots 250, the fingers 252, and the corresponding slotted engagement openings 256 may vary. For example, instead of the vertically offset arrangement along the line 244 described above, each of the slots 250 and the fingers 252 may be arranged in a horizontally offset, side-by-side arrangement with one slot 250 and finger 252 of the pair disposed on one side of the line 244 and the other slot 250 and finger 252 being disposed on the other side of the line 244. In another example, instead of the pair of slots 250, the fingers 252, and the slotted engagement openings 256, there may be a single finger 252 engaging a single engagement opening 256 or three or more fingers 252 engaging three or more corresponding engagement openings 256. The shapes of the slots 250, the fingers 252, and the engagement openings 256 may also vary from the example shapes described above. For example, the fingers 252 may be a tapered wedge shape that may engage a corresponding engagement opening 256 having a similar shape.

By using the example mounting bracket 234 with the jamb channel 254, a builder, contractor, or installer may quickly and easily secure the mounting bracket 234 within the jamb channel 254 without having to use, purchase, or manage any additional connection hardware (e.g., the screw 53) to affix the mounting bracket 234 within the jamb channel 254. Additionally, the mounting bracket 234 does not require any tools for installation.

With reference now to FIGS. 9A, 9B, 9C, and 9D, still another example mounting bracket 334 is shown. Similar to other example embodiments described herein, the mounting bracket 334 may be used in place of the other example brackets in the window balance assembly 20. That is, the mounting bracket 334 may be used with the above-described carrier 30 and the curl spring 32. The mounting bracket 334 may be formed of a polymeric material, metal, or alloy.

The mounting bracket 334 may have a C-channel-shaped body 336 that includes a first wall 338, a second wall 340, and a third wall 342. The second and third walls 340, 342 may be parallel to each other, as well as being perpendicular to the first wall 338. The mounting bracket 334 may be symmetrical about line 344. The line 344 may also indicate the longitudinal axis of the mounting bracket 334.

The mounting bracket 334 has a flat rear face or surface 346 that may be a rear surface for each of the first, second, and third walls 338, 340, 342. The rear surface 346 may be a surface of the mounting bracket 334 that is adjacent to a wall in a jamb channel to which the mounting bracket 334 is attached.

The first wall 338 has a front surface 348. The front surface 348 is disposed between the second and third walls 340, 342.

The first wall 338 may include a pair of openings 350. The openings 350 extend from the front surface 348 through to the rear surface 346 to allow a shank of a mechanical fastener to pass through the opening 350 for attaching the mounting bracket 334 within a jamb channel. For example, the openings 350 may be used with the screw 53 to affix the mounting bracket 334 within a jamb channel. Each of the openings 350 may include a countersink 352 surrounding the opening 350 on the front surface 348. The countersink 352 may be used with a mechanical fastener having a countersunk head (i.e., a conical head), such as the screw 53, so that the head of such fastener sits flush with the front surface 348 of the first wall 338 when the bracket is affixed by such fastener to the jamb channel.

Similar to the symmetry of the previous embodiment, the mounting bracket 334 is symmetrical about the line 344 and may be used interchangeably on either a left or right window jamb, for example, the left and right window jambs 16 of the window assembly 10 shown in FIG. 1. On account of the symmetry between the second and third walls 340, 342, the description of the second and third walls 340, 342 includes features common to both.

Each of the second and the third walls 340, 342 have an inside face 354, an outside face 356, a front face 358, a top face 360, and a bottom face 362.

Given the C-channel shape of the bracket body 336, the inside face 354 may face toward the inside of the channel. That is, the inside face 354 is adjacent and perpendicular to the front surface 348 of the first wall 338. The inside faces 354 of the second and third walls 340, 342 face toward each other.

The outside face 356 is disposed opposite the inside face 354. The outside face 356 may have an opening 364 that opens to a recessed portion 366. The outside face 356 may also have a cover portion 368 that covers a slot 370.

The front face 358 is disposed between the inside face 354 and the outside face 356, and faces in a direction perpendicular to, and away from, the first wall 338. The front face 358 and the front surface 348 of the first wall 338 may face in the same direction. The front face 358 may have an opening 372 that opens to both the recessed portion 366 and the slot 370.

The top face 360 is disposed between, and perpendicular to, the inside face 354 and the outside face 356. The bottom face 362 is disposed opposite the top face 360 and between the inside face 354 and the outside face 356. The bottom face 362 may have an opening 374 that opens to the slot 370.

Figure 10A:
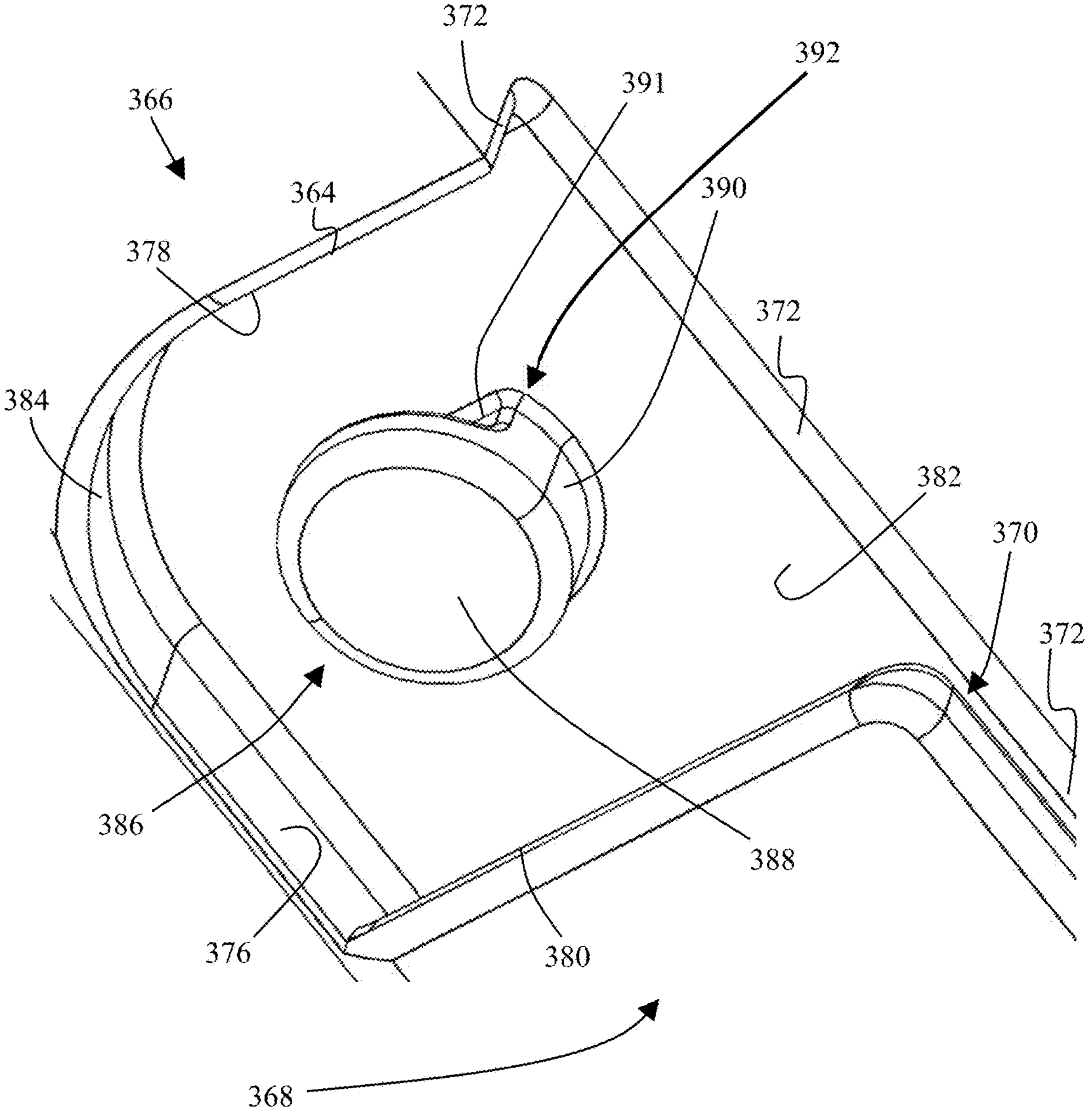
FIG. 10A is a perspective view of a recessed portion and boss of the example mounting bracket shown in FIG. 9A.
Figure 10B:
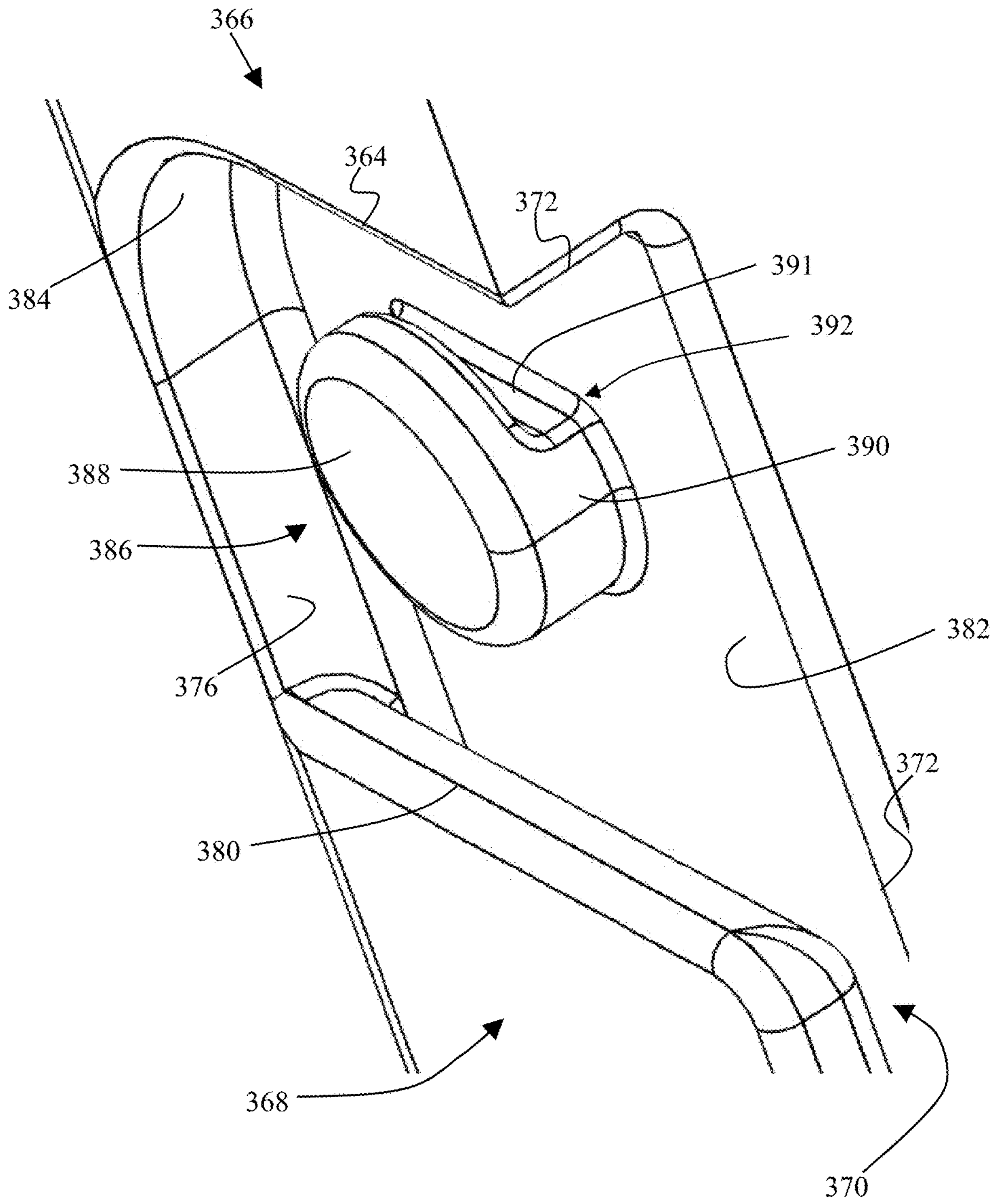
FIG. 10B is another perspective view of the recessed portion and boss of the example mounting bracket shown in FIG. 9A.

With additional reference now to FIGS. 10A and 10B, an enlarged perspective view of the recessed portion 366 is illustrated. The recessed portion 366 in the second and third walls 340, 342 is a recess that extends from the opening 364 on the outside face 356 into the second and third walls 340, 342. The recessed portion 366 may be bounded by a first recess wall 376, a second recess wall 378, the opening 372 on the front face 358, the slot 370, a top edge 380 of the cover portion 368, and a bottom recess surface 382.

The first recess wall 376 may face in the same direction as the front face 358. As such, the plane including the first recess wall 376 may be parallel to the plane including the front face 358.

The second recess wall 378 may face in the same direction as the bottom face 362. That is, the plane including the second recess wall 378 may be parallel to the plane including the bottom face 362. The first recess wall 376 and the second recess wall 378 may be interconnected by a curved recess wall 384.

A height of the recessed portion 366, measured as a distance from the top edge 380 of the cover portion 368 to the second recess wall 378, may be slightly larger than a width of the curl spring 32. Likewise, the width of the recessed portion 366, measured as a distance from the first recess wall 376 to a surface of the front face 358 or the opening 372 on the front face 358, may be slightly larger than the width of the curl spring 32. That is, the recessed portion 366 may be sized to accommodate part of the uncurled end portion 52 of the curl spring 32. A depth of the recessed portion 366 may be measured as a distance from the outside face 356 to the bottom recess surface 382.

The recessed portion 366 may also have a boss 386 disposed centrally within the recessed portion 366. The boss 386 may be cylindrically shaped and extend from the bottom recess surface 382 toward the outside face 356. The boss 386 may have a face 388, a side 390, and groove 392. The groove 392 extends into the side 390 and has a ledge 391 provided by the surface that faces toward the second recess wall 378, and a surface that faces toward the bottom recess surface 382. A height of the boss 386 may be measured as a distance from the bottom recess surface 382 to the face 388 of the boss 386. The height of the boss 386 may be less than the depth of the recessed portion 366. A diameter of the boss 386 may be less than a diameter of the aperture 58 on the curl spring 32. That is, the aperture 58 on the curl spring 32 is sized so that the boss 386 may be inserted into the aperture 58 so that the aperture 58 encircles the boss 386.

Figure 11A:
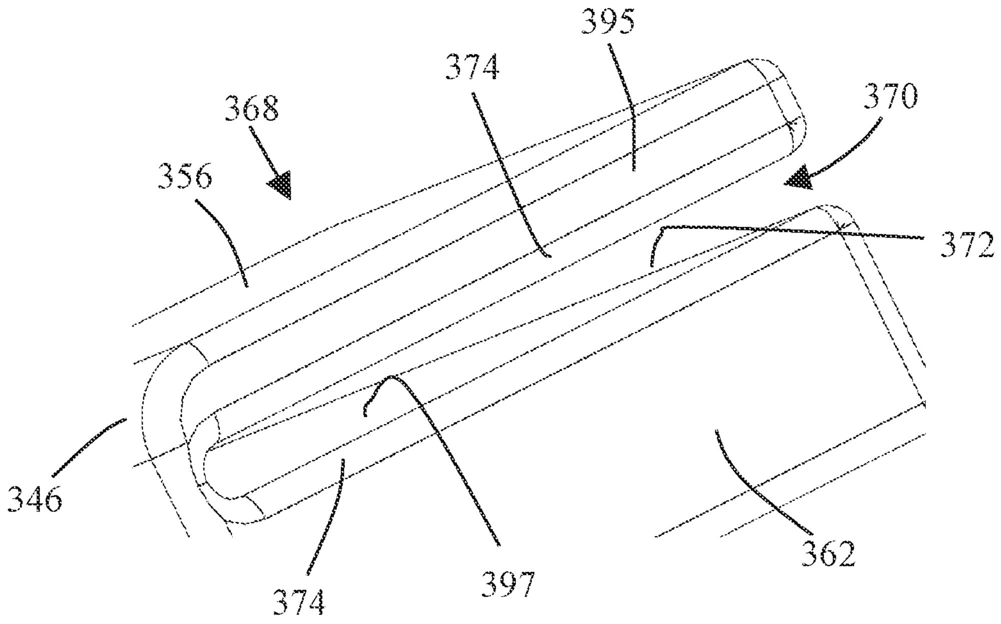
FIG. 11A is a perspective view of a slot on the example mounting bracket shown in FIG. 9A.
Figure 11B:
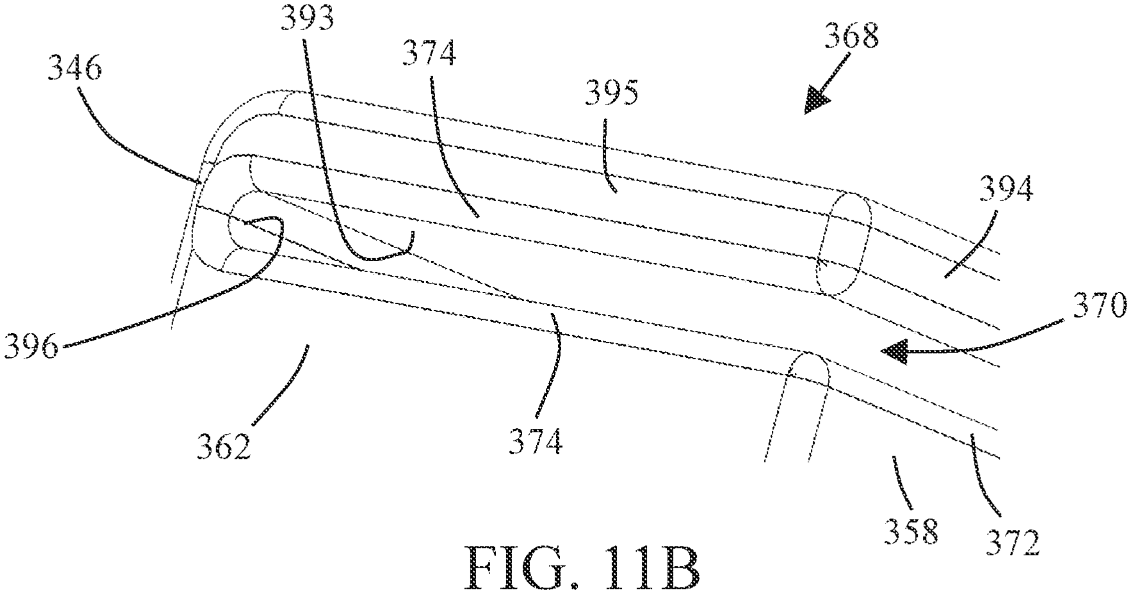
FIG. 11B is another perspective view of the slot on the example mounting bracket shown in FIG. 9A.

With additional reference now to FIGS. 11A and 11B, an enlarged perspective view of the cover portion 368 shown covering the slot 370 is illustrated. The cover portion 368 may be a planar member that extends from the rear surface 346 to the front faces 358 of the second and third walls 340, 342 and from the bottom face 362 to the recessed portion 366 to cover the slot 370. That is, the cover portion 368 is a cantilevered slab that extends from the rear surface 346 to cover the slot 370. One surface of the cover portion 368 is the outside face 356 of the walls 340, 342. A first slit facing surface 393 is disposed opposite the outside face 356 and faces toward the slot 370. The cover portion 368 may also have the top edge 380 that faces toward the recessed portion 366 and extends from the rear surface 346 to the front face 358; a front edge 394 that extends from the top edge 380 to the bottom face 362; and a bottom edge 395 that extends from the front edge 394 to the rear surface 346.

The slot 370 is a narrow passage that extends into the second and third walls 340, 342 from the front face 358 at the front face opening 372, the bottom face 362 at the bottom face opening 374, and the recessed portion 366. The slot 370 may be bounded by the first slot facing surface 393 of the cover portion 368, a slot wall 396, and a second slot facing surface 397. The first slot facing surface 393 and the second slot facing surface 397 may be interconnected by the slot wall 396 to define boundaries of the slot 370. The first slot facing surface 393 and the second slot facing surface 397 may face each other with the slot 370 disposed between the surfaces 393, 397. The slot 370 and the recessed portion 366 may be interconnected.

The slot wall 396 extends from the bottom face 362 to the recessed portion 366 and may face in the same direction as the front face 358. The slot wall 396 may be interconnected to, and transition to be part of, the first recess wall 376 after the slot wall 396 extends past the top edge 380 of the cover portion 368 and into the recessed portion 366.

The second slot facing surface 397 may extend from the slot wall 396 to the front face 358 and from the bottom face 362 to the recessed portion 366. The second slot facing surface 397 may be interconnected to, and may transition to be part of, the bottom recess surface 382 after extending past the top edge 380 of the cover portion 368 and into the recessed portion 366.

A depth of the slot 370, as measured as a distance from the first slot facing surface 393 of the cover portion 368 to the second slot facing surface 397, may be large enough to accommodate a thickness of the curl spring 32.

Figure 12C:
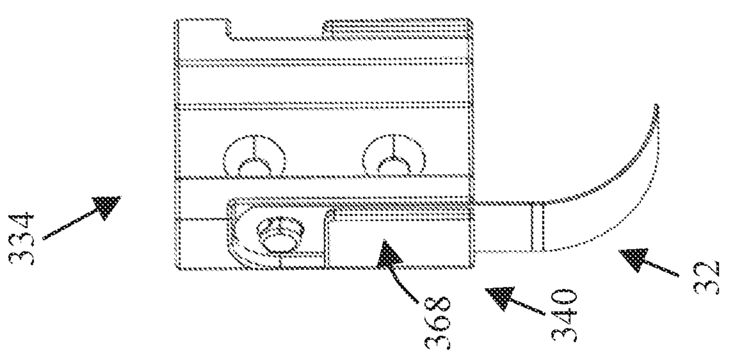
FIG. 12C illustrates the curl spring selectively engaged to the example mounting bracket shown in FIG. 9A.
Figure 12B:
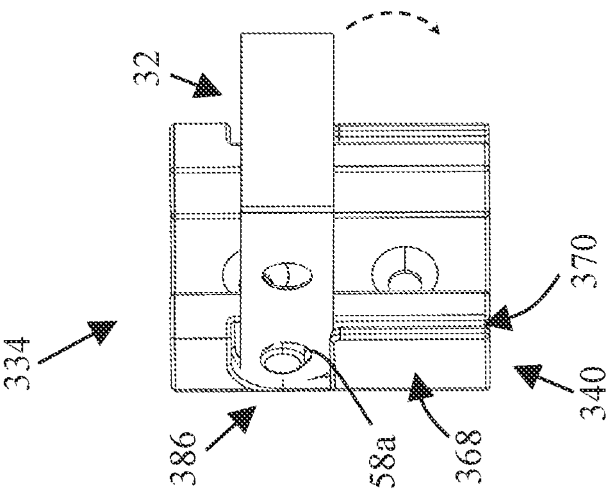
FIG. 12B illustrates the curl spring being selectively engaged to the example mounting bracket shown in FIG. 9A.
Figure 12A:
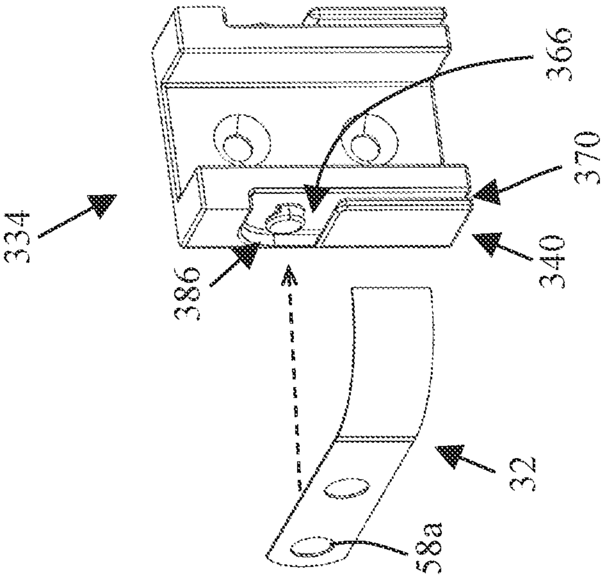
FIG. 12A illustrates a curl spring selectively disengaged from the example mounting bracket shown in FIG. 9A.

With reference now to FIGS. 12A, 12B, and 12C, an example engagement of the curl spring 32 to the mounting bracket 334 is illustrated. More specifically, FIGS. 12A-12C illustrate how the curl spring 32 engages the boss 386 in the recessed portion 366 of the second wall 340 and how the curl spring 32 is rotated relative to the mounting bracket 334 to enter into the slot 370 and be covered by the cover portion 368 of the mounting bracket 334. While the example engagement shows an engagement of the curl spring 32 to the boss 386 on the second wall 340, the engagement of the curl spring 32 to the boss 386 on the third wall 342 may be similar.

The curl spring 32 illustrated in FIGS. 12A-12C is a cutaway portion of the curl spring 32 and is not shown in complete detail. While only a portion of the curl spring 32 is illustrated in FIGS. 12A-12C, it will be appreciated that portions of the curl spring 32 not shown in the drawings may be attached the carrier 30, for example, as shown in FIGS. 1 and 2A.

As shown in FIG. 12A, the curl spring 32 may be first rotated to a horizontal orientation to engage the mounting bracket 334. Alternatively, the mounting bracket 334 may be rotated relative to the curl spring 32 to engage the curl spring 32. The curl spring 32, and more specifically the aperture 58*a* of the curl spring 32, is then moved toward the recessed portion 366 and the boss 386, as indicated by the dashed arrow in FIG. 12A.

With reference to FIG. 12B, the aperture 58*a* of the curl spring 32 may then be moved into the recessed portion 366 and past the face 388 and the side 390 of the boss 386 toward the bottom recess surface 382 until the curl spring 32 and the aperture 58*a* reaches the groove 392 on the boss 386.

The curl spring 32 may then be rotated approximately ninety degrees, as shown by the dashed arrow in FIG. 12B until the curl spring 32 reaches a vertical orientation, for example, as shown in FIG. 12C.

Referring again to FIGS. 9A-11B, the height and width of the recessed portion 366 relative to the width of the curl spring 32, in addition to the curved recess wall 384, may allow for the rotation of the curl spring 32 in the recessed portion 366 once the aperture 58*a* is positioned on the ledge 391 of the groove 392 of the boss 386. As the curl spring 32 rotates from a horizontal to a vertical orientation, a portion of the curl spring 32 may enter the slot 370 at the front face opening 372. The curl spring 32 may continue to rotate within the slot 370 until a portion of the curl spring 32 is covered by the cover portion 368 and the curl spring emerges from the opening 374 on the bottom face 362. Further forward rotation of the curl spring 32, once the curl spring 32 enters the slot 370, may be limited by the slot wall 396.

Once the curl spring 32 is engaged to the mounting bracket 334, as shown in FIG. 12C, the spring force of the curl spring 32 may urge the curl spring downward toward the carrier 30. As a result, the curl spring 32 exerts a downward force on the ledge 391 of the groove 392 of the boss 386 to maintain an engagement between the curl spring 32 and the boss 386. Where an opposing force is applied to the curl spring 32 that may reduce or counter the spring force of the curl spring 32, for example, moving the lower sash 14 in FIG. 1, the second recess wall 378 and the wall 390 of the boss 386 may limit and/or prevent upward movement of the curl spring 32, where such an upward movement may cause the curl spring 32 to disengage from the boss 386. The groove 392 and the cover portion 368, along with the spring force of the curl spring 32, may limit lateral movement of the curl spring on the boss 386 toward the outside face 356. Once the mounting bracket 334 with engaged curl spring 32 is installed in a jamb channel, the dimensions of the jamb channel may limit and/or prevent the curl spring 32 from rotating toward and outside of the slot 370. That is, the dimensions of the jamb channel where the mounting bracket 334 is mounted may prevent the curl spring 32 from rotating out of the slot 370 and toward the horizontal orientation shown in FIGS. 12A and 12B, where such a horizontal orientation may disengage the curl spring 32 from the boss 383 of the mounting bracket 334.

Figure 13:
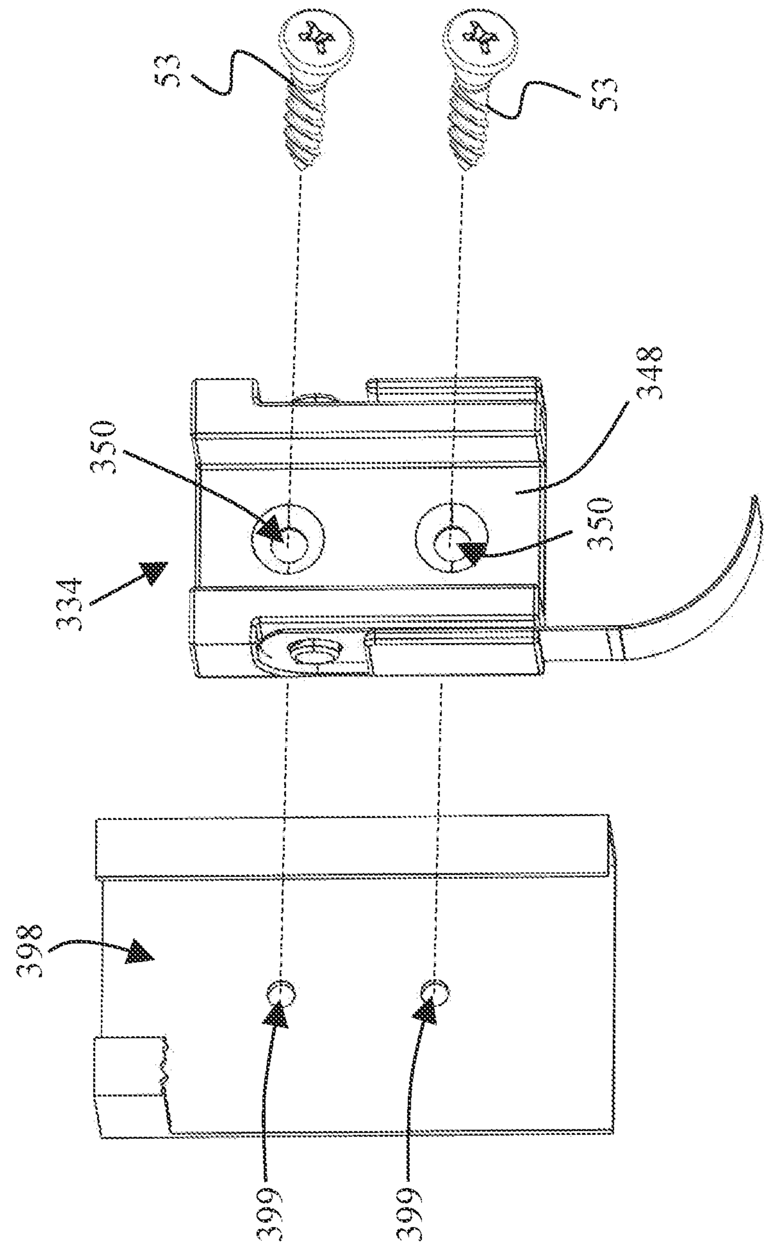
FIG. 13 illustrates an example jamb channel for installing the example mounting bracket shown in FIG. 9A.
Figure 14:
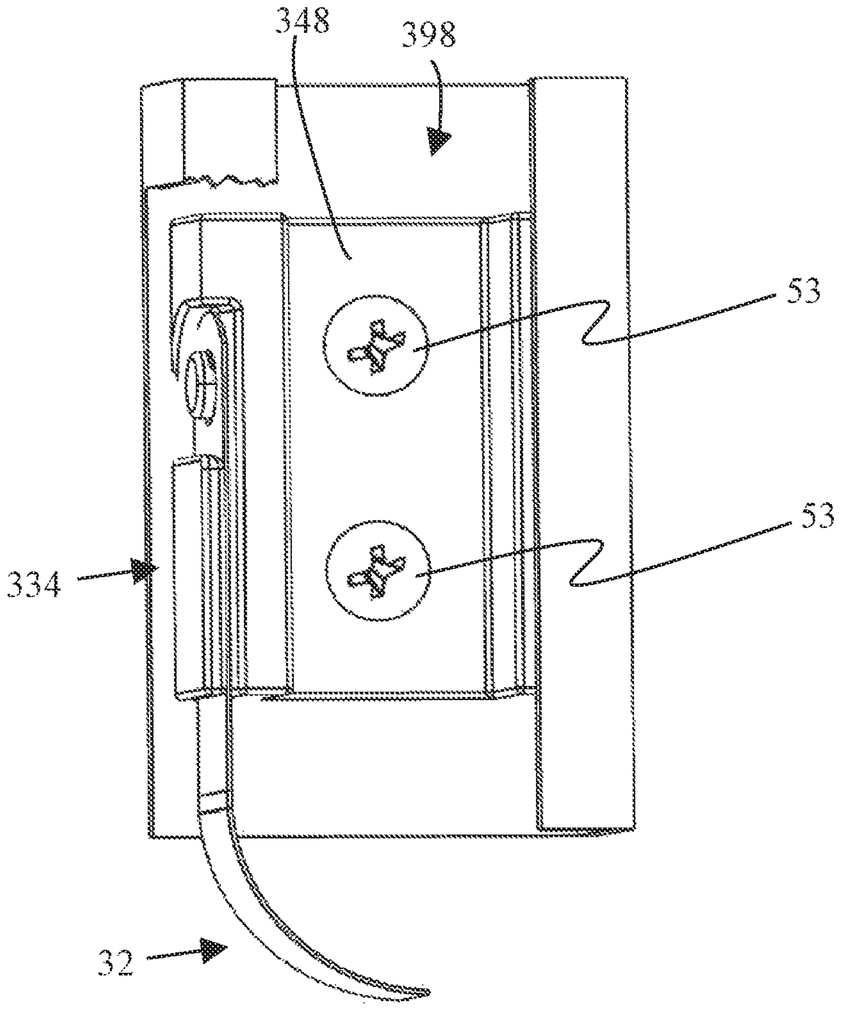
FIG. 14 illustrates the example mounting bracket shown in FIG. 9A installed in the example jamb channel shown in FIG. 13.

With reference now to FIGS. 13 and 14, an example installation of the mounting bracket 334 in a jamb channel is illustrated. A cutaway view of an example jamb channel 398 is shown in FIGS. 13 and 14. The jamb channel 398 may include guide openings 399 (i.e., pilot holes) to indicate where the mounting bracket 334 should be mounted within the jamb channel 398 and to ease the driving of the screws 53 into the wall of the jamb channel 398. As shown in FIG. 13, the screws 53 may be passed through openings 350 and the guide openings 399 and driven into the wall of the jamb channel 398. The screws 53 may be driven until the heads of the screws 53 are flush with the front surface 348 of the bracket 334, as shown in FIG. 14.

The recessed portion 366, the boss 386, the cover portion 368, and the slot 370 may allow a builder, contractor, or installer to selectively engage/disengage the curl spring 32 and carrier 30 to the mounting bracket 334 while limiting and/or preventing the detachment of the mounting bracket 334 from the curl spring 32 and the carrier 30 components of a window balance assembly in the marketplace, while in transit, or during installation.

Figure 15B:
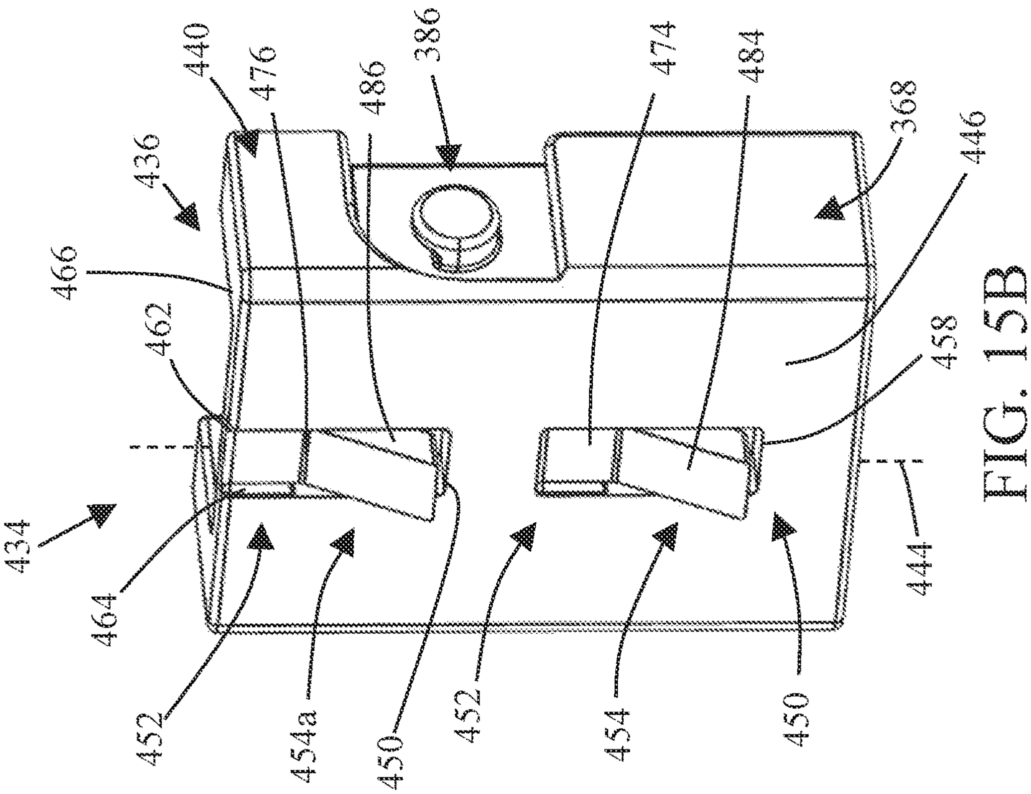
FIG. 15B is another perspective view of the example mounting bracket shown in FIG. 15A.
Figure 15A:
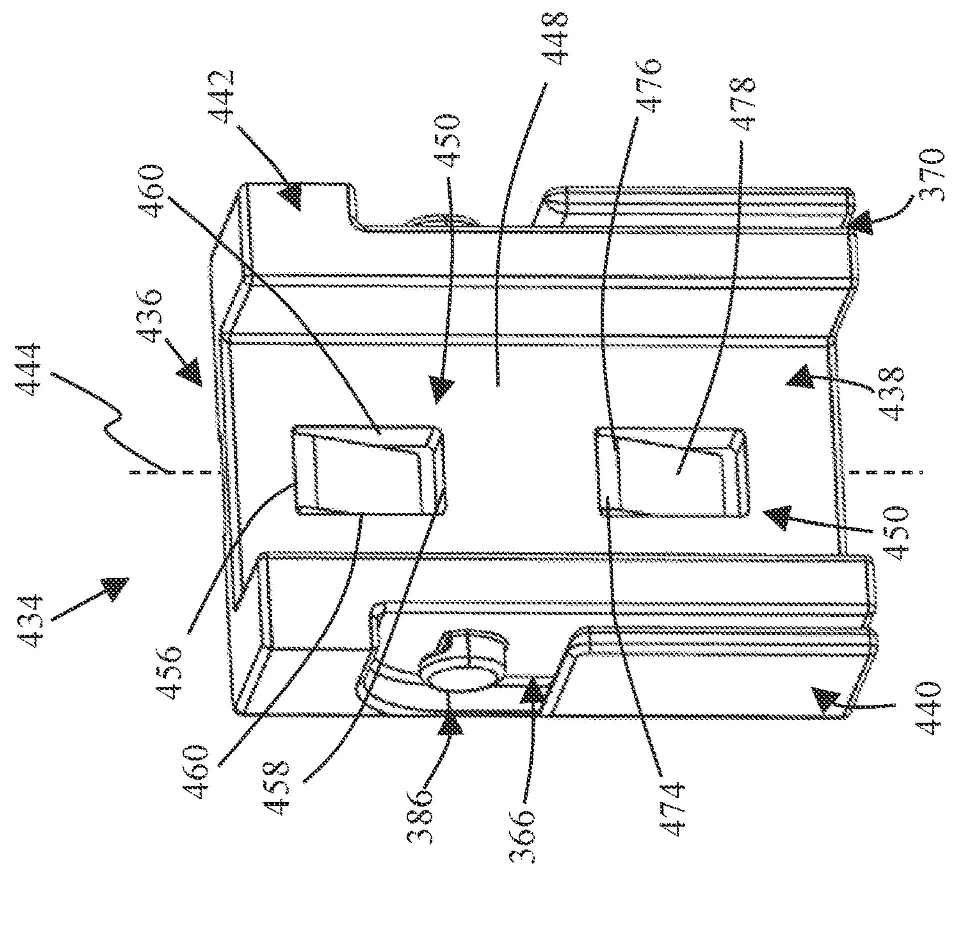
FIG. 15A is a perspective view of yet even another example mounting bracket.
Figure 15C:
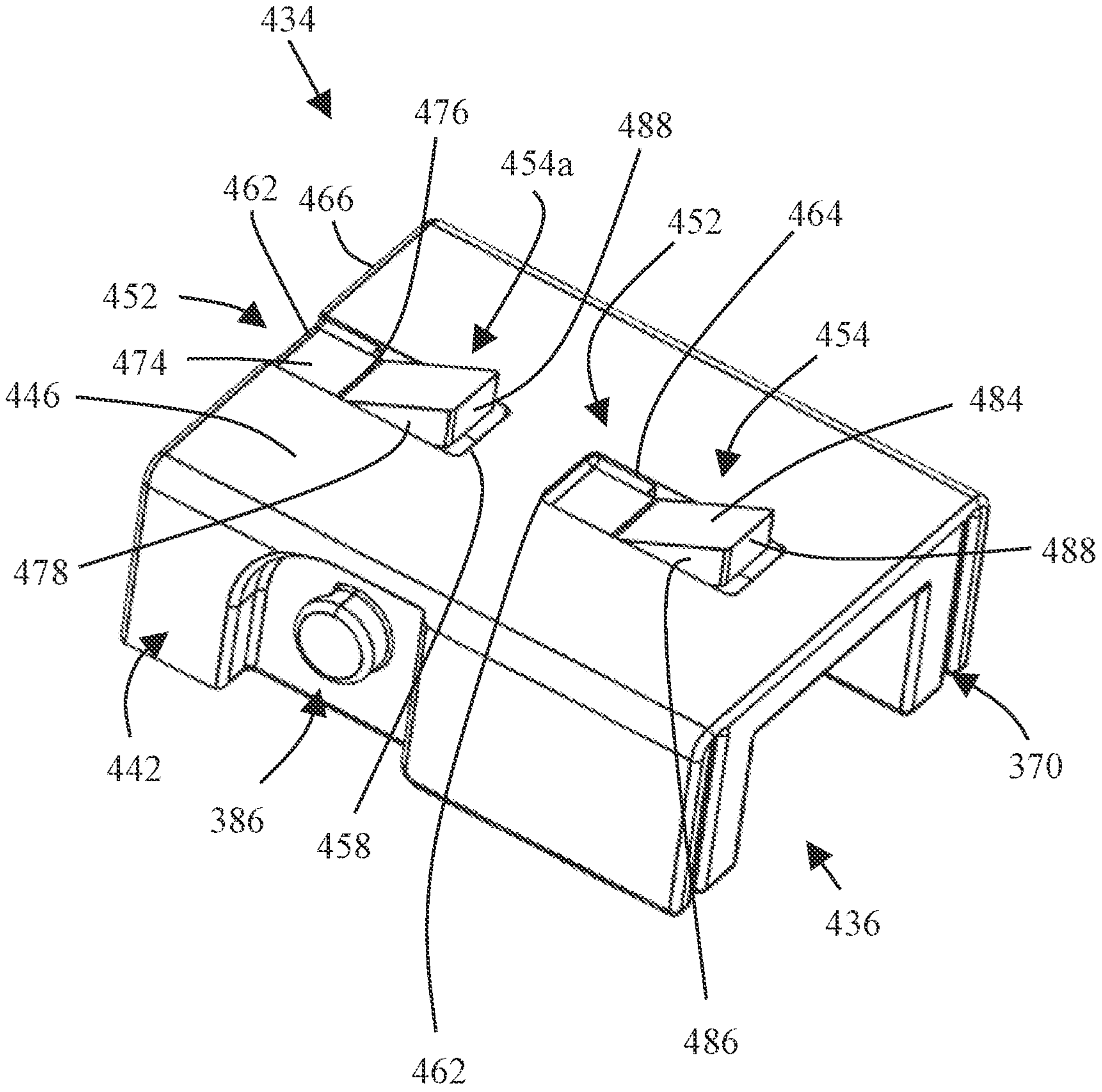
FIG. 15C is yet even another perspective view of the example mounting bracket shown in FIG. 15A.

With reference now to FIGS. 15A, 15B, and 15C, perspective views of yet another example embodiment of a mounting bracket 434 are illustrated. Similar to other example embodiments described herein, the mounting bracket 434 may be used in place of the other example brackets in the window balance assembly 20. That is, the mounting bracket 434 may be used with the above-described carrier 30 and the curl spring 32. The mounting bracket 434 may be formed of a polymeric material, a metal, or an alloy.

The mounting bracket 434 may have a C-shaped channel body 436 that includes a first wall 438, a second wall 440, and a third wall 442. The second and third walls 440, 442 may be parallel to each other, as well as being perpendicular to the first wall 438. Similar to previous embodiments, the mounting bracket 434 may be symmetrical. That is, the mounting bracket 434 may be symmetrical about the line 444 and may be used interchangeably on either a left or right window jamb, for example, the window jambs 16 of the window assembly 10 shown in FIG. 1. The line 444 may also indicate the longitudinal axis of the mounting bracket 434.

The mounting bracket 434 has a rear face or surface 446 that may be the rear surface for each of the first, second, and third walls 438, 440, 442. The rear surface 446 may be a surface of the mounting bracket 434 that is adjacent to a wall in a jamb channel to which the mounting bracket 434 is attached.

The first wall 438 has a front surface 448 disposed between the second and third walls 440, 442. The first wall 438 may include a pair of slotted openings 450. A portion of the rear surface 446 corresponding to the front surface 448 of the first wall 438 may also include a pair of slotted recesses 452 that may correspond to the slotted openings 450. A portion of each of the slotted recesses 452 may interconnect with a portion of the corresponding slotted opening 450. A resilient, pivotable spring finger 454 may be formed near a top of each of the slotted openings 450 and the corresponding slotted recess 452.

Each of the slotted openings 450 may be disposed centrally on the first wall 438 and along the line 444 in a vertical arrangement where one of the slotted openings 450 is disposed above the other of the slotted openings 450. Each of the slotted openings 450 may be bounded by a top edge 456, a bottom edge 458, and side edges 460. An inner volume of each of the slotted openings 450 may be defined by the dimensions of the boundary edges 456, 458, and 460. The spring finger 454 may occupy a portion of the volume within each of the slotted openings 450. Each of the slotted openings 450 may be an elongated rectangular-shaped opening with curved corners that extends from the front surface toward the rear surface 446.

The slotted recesses 452 on the rear surface 446 may be an area or recess where additional material (i.e., in addition to the material removed for the slotted openings 450) is removed from the rear surface 446 to form the spring fingers 454. Each of the slotted recesses 452 may have a top edge 462 and side edges 464. The top edge 462 of the upper spring finger 454*a*, as shown in FIGS. 15B and 15C, may be a top surface 466 of the mounting bracket 434. The side edges 464 of each slotted recess 452 may interconnect with the side edges 460 of the corresponding slotted opening 450.

The spring fingers 454 may be used to engage or attach the mounting bracket 434 to corresponding features in a jamb channel. For example, with reference now to FIG. 16, a jamb channel 468 may include engagement openings 470 on a wall 472. The engagement openings 470 may be used to engage the spring fingers 454 to attach the mounting bracket 434 to the wall 472 in the jamb channel 468.

With reference again to FIGS. 15A-15C, each of the spring fingers 454 may include a stationary portion 474, a living hinge 476, and a moving or engagement portion 478.

The stationary portion 474 of the spring finger 454 may extend from the top edge 462 of the slotted recesses 452 along the side edges 464 of the slotted recesses 452 and toward the top edge 460 of the slotted openings 450. The stationary portion 474 of the spring finger extends past the top edge 460 of the slotted opening 450, before terminating at the living hinge 476.

The living hinge 476 is a hinge between the stationary portion 474 and the engagement portion 478 formed as a region of reduced thickness in the material of the stationary portion 472 and the engagement portion 478. The region of reduced thickness may, for example, take the form of a groove or notch in the material. The living hinge 476 acts as a bridge between the stationary portion 474 and the engagement portion 478 in the spring finger 454 and may allow the engagement portion 478 to move and rotate relative to the stationary portion 474. For example, the living hinge 476 may allow portions of the engagement portion 478 outside of the slotted opening 450 to rotate and move into the slotted opening 450 so that an entirety of the engagement portion 478 can be disposed within the slotted opening.

In addition to acting like a hinge to allow the engagement portion 478 to move and pivot or rotate relative to the stationary portion 474, the living hinge 476 may also provide a resistive force (i.e., a resilient spring force) when the engagement portion 478 is moved from a nominal position (e.g., an unbiased condition). As shown in FIGS. 15A-15C, portions of the engagement portion 478 may extend out of the slotted opening 450 and away from the rear surface 446 of the mounting bracket 434 when the engagement portion 478 is in an unbiased condition. However, when a force is applied to the engagement portion 478 to urge the engagement portion 478 into the slotted opening 450 and out of the nominal position, the living hinge 476 may generate a spring force (i.e., a bias) such that when the force urging the engagement portion 478 from the nominal position is released, the spring force in the living hinge 476 "snaps" or "springs" (i.e., forcefully returns) the engagement portion 478 back to the nominal position.

With reference again to FIG. 16, the engagement portion 478 of the of the spring finger 454 may be used to engage the engagement openings 470 of the wall 472 in the jamb channel 468 to attach the mounting bracket 434 to the wall 472. That is, a portion of the engagement portion 478 may be inserted into the engagement opening 470 to attach the mounting bracket 434 to the wall 472. The dimensions of the engagement portion 478 may be similar to the dimensions of the engagement opening 470 so as to cause a friction fit between the engagement portion 478 and the engagement opening 470 when the engagement portion 478 is inserted into the engagement opening 470. More specifically, surfaces on portions of the engagement portion may contact side edges 480 or a bottom edge 482 in the engagement opening 470 to attach the mounting bracket 434 to the wall 472.

With reference again to FIGS. 15A, 15B, and 13C, the engagement portion 478 of the spring finger 454 may have a polyhedron shape such as a triangular prism. The engagement portion may have a wall contact surface 484, side surfaces 486, and an engagement surface 488.

Figure 16:
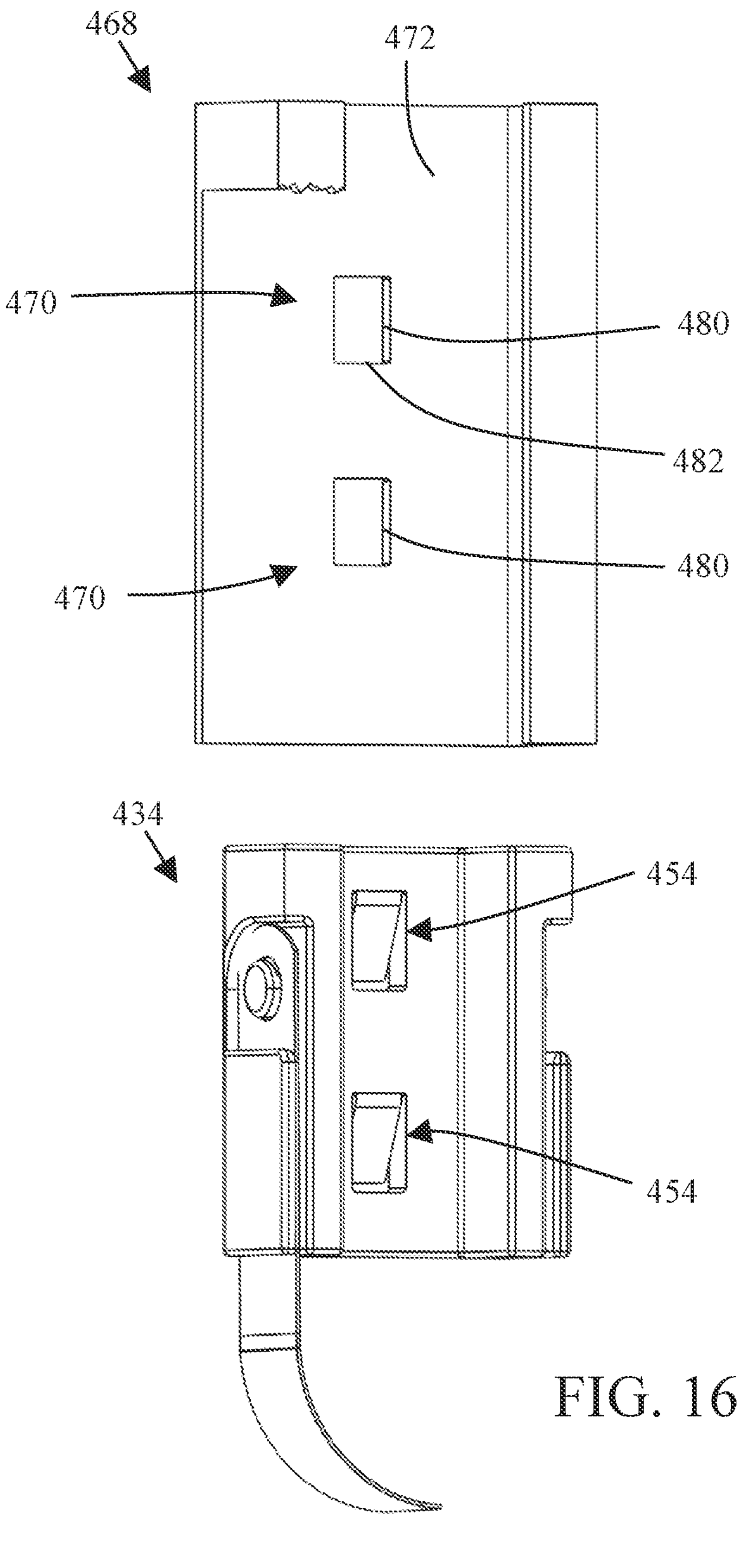
FIG. 16 illustrates an example jamb channel for installing the example mounting bracket shown in FIG. 15A.

The wall contact surface 484 of the engagement portion 478 may be a surface that contacts a wall of a jamb channel during the installation of the mounting bracket 434, for example, the wall 472 of the jamb channel 468 in FIG. 16. When an installer presses the rear surface 446 of the mounting bracket 434 against the wall 472 of the jamb channel 468 during the installation of the mounting bracket 434, the wall 472 may contact and exert a force on the wall contact surface 484 to urge portions of the engagement portion 478 toward the slotted opening 450.

The side surfaces 486 of the engagement portion 478 are disposed on sides of both the wall contact surface 484 and the engagement surface 488. The side surfaces 486 may be parallel to each other. During installation of the mounting bracket 434 to the wall 472 in the jamb channel 468, the side surfaces 486 may be in contact with the side edges 480 of the engagement opening 470 so as to cause a friction fit between the engagement portion 478 and the engagement opening 470.

Figure 17B:
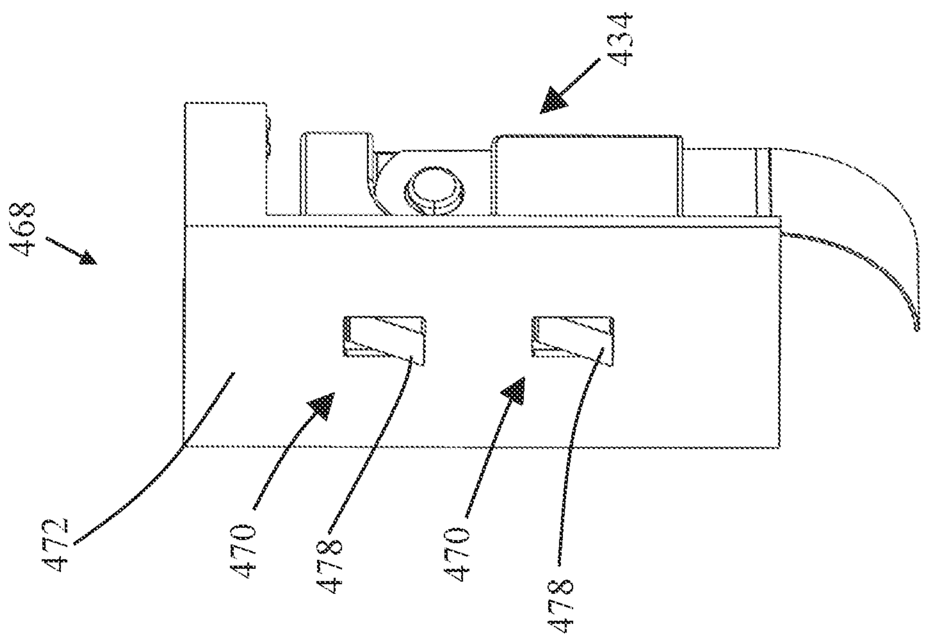
FIG. 17B is another perspective view of the example mounting bracket shown in FIG. 15A installed in the example jamb channel shown in FIG. 16.

The engagement surface 488 may be a bottom surface of the engagement portion 478. The engagement surface 488 may contact the bottom edge 482 of the engagement opening 470 when the engagement portion 478 is inserted into the engagement opening 470 in the wall 472 of the jamb channel 468, as shown in FIG. 17B. In this manner, the engagement surface 488 may engage the bottom edge 482 to counter any downward acting forces on the mounting bracket 434, such as gravity and the force that may be exerted by the curl spring 32.

While the example engagement portions 478 of the spring fingers 454 and corresponding engagement openings 470 may have a wedge or triangular prism shape, it will be appreciated that the shapes of the engagement portions 478 and corresponding engagement openings 470 may vary. Likewise, the arrangement and orientation of the spring fingers 454 and corresponding engagement openings 470 may also vary. For example, instead of the vertically-offset arrangement described above, the spring fingers 454 may be horizontally offset from each other with one spring finger 454 on one side of the line 444 and the other spring finger 454 disposed on the other side of the line 444, where the corresponding engagement openings 470 are also arranged in a horizontally-offset arrangement. Further, while a pair of spring fingers 454 and engagement openings 470 have been described above, the mounting bracket 434 may have, for example, one spring finger 454 that may attach to a single engagement opening 470 in a jamb channel, or three or more spring fingers 454 that may attach to three or more corresponding engagement openings 470.

With reference again to FIGS. 15A-15C, the second and third walls 440, 442 may include the recessed portion 366, the cover portion 368, the slot 370, and the boss 386, as well as other attachment features for the curl spring 32, as described in the previous example embodiment above for the mounting bracket 334, for attaching the curl spring 32 to the mounting bracket 434. As such, a repeat description of these features is omitted. An installer may attach the curl spring 32 to the mounting bracket 434 by positioning the boss 386 within the aperture 58 of the curl spring 32.

Figure 17A:
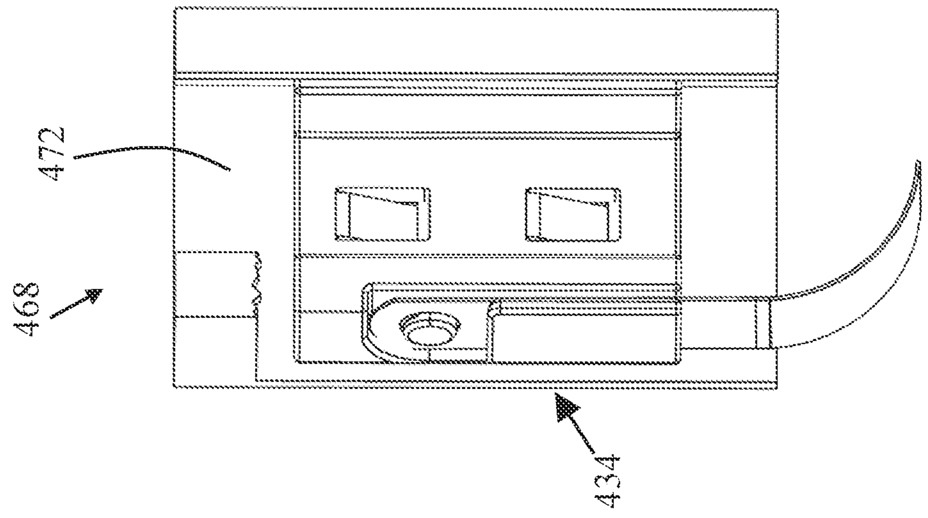
FIG. 17A is a perspective view of the example mounting bracket shown in FIG. 15A installed in the example jamb channel shown in FIG. 16.

With reference now to FIGS. 16, 17A, and 17B, an example installation of the mounting bracket 434 is described. Once the curl spring 32 is attached to the mounting bracket 434, an installer may move the mounting bracket to position the rear surface 446 of the mounting bracket 434 against the wall 472 of the jamb channel 468. When the wall contact surfaces 484 of the engagement portions 478 contact the wall 472, the engagement portions 478 are moved from nominal positions and urged toward the slotted openings 450 so that portions of the engagement portions 478 previously disposed outside of the slotted openings 450 are moved into the slotted openings 450. When the engagement portions 478 are moved from the nominal positions, spring forces may be generated in the living hinges 476 of the spring fingers 454. At this time, the wall contact surfaces 484 of the engagement portions 478 may be flush with the rear surface 446 of the mounting bracket 434 to allow an installer to move the rear surface 446 of the mounting bracket 434 flush against the surface of the wall 472 in the jamb channel.

As the installer moves the rear surface 446 of the mounting bracket 434 along the wall 472, when the mounting bracket 434 moves over the engagement openings 470 in the wall 472 so that the wall contact surfaces 484 are no longer in contact with the wall 472, the spring forces in the living hinges 476 are released causing the engagement portions 478 to snap into, and engage, the engagement openings 470 to attach the mounting bracket 434 to the wall 472, for example, as shown in FIGS. 17A and 17B.

The spring fingers 454 of the mounting bracket 434 may allow an installer to more quickly install the mounting bracket 434 within a jamb channel without having to use any tools or additional fasteners to attach the mounting bracket 434. In addition, the boss 386, the cover portion 368, and the slot 370 may allow a builder, contractor, or installer to selectively engage/disengage the curl spring 32 and carrier 30 to the mounting bracket 434 while limiting and/or preventing the detachment of the mounting bracket 434 from the curl spring 32 and the carrier 30 components of a window balance assembly in the marketplace, while in transit, or during installation.

While example embodiments of mounting brackets for a window balance assembly have been described and illustrated, other example embodiments of mounting brackets are possible by combining and/or substituting the features of one example mounting bracket with the features of another example mounting bracket. That is, features for attaching one example mounting bracket to a wall in a jamb channel may be substituted or combined with the wall attachment features of another example mounting bracket. Likewise, the features for attaching the curl spring 32 to an example mounting bracket may be substituted or combined with the curl spring attachment features of another example mounting bracket.

For example, the first hook 92 and the second hook 96 used to selectively engage the curl spring 32 to the mounting bracket 34 may be used in place of the curl spring attachment features on the second and third walls of the mounting brackets 234, 334, and 434.

In another example, the fingers 252 for attaching the mounting bracket 234 to the wall of a jamb channel may be replaced with the screw 53 and opening 350 attachment features of the mounting bracket 334 and/or the spring fingers 454 of the mounting bracket 434, or as a combination of fingers 252, screw 53 and opening 350.

In yet another example, the hooks 276 on the mounting bracket 234 for attaching the curl spring 32 may be replaced by the boss 386 and additional curl spring attachment features of the mounting brackets 334, 434. Similarly, the boss 386 for the mounting brackets 334 and 434 may be replaced by the hook 276 so that the hook 276 is disposed in the recessed portion 366 and used with the cover portion 368 and slot 370 to secure the curl spring 32 to a mounting bracket.

A still further example involves providing one or more resilient, pivotable spring fingers in one or more walls of the jamb channel (as opposed to on the mounting bracket) and one or more corresponding engagement openings in one or more of the walls of the mounting bracket (as opposed to in the jamb channel).

While a complete iteration of all possible combinations and substitutions of mounting bracket to wall attachment features and curl spring to bracket attachment features is omitted, a skilled artisan would readily envision the extent of such possible combinations and substitutions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A window balance configured to be disposed in a jamb of a hung window assembly and configured to connect to a moveable sash of the hung window assembly, the window balance comprising:

a mounting bracket comprising a body having a front side, a rear side, a lateral side and an upper end;

a carrier comprising an upper end, a lower end and a housing, the housing comprising a first housing portion and a second housing portion which together define an interior space, and a receiver disposed near the lower end of the carrier and configured to receive a pivot bar of the moveable sash of the hung window assembly; and a constant force curl spring comprising a curled portion within the interior space of the housing of the carrier and an uncurled end portion extending from the curled portion outside of the interior space of the housing of the carrier, wherein the uncurled end portion has a width and a thickness;

wherein the body of the mounting bracket comprises at least one opening passing through the body from the front side of the mounting bracket to the rear side of the mounting bracket, the at least one opening being configured to receive a fastener for attaching the mounting bracket to a wall of the jamb;

wherein the mounting bracket is symmetrical such that the mounting bracket is configured to be installed in either a left-hand jamb of the hung window assembly or a right-hand jamb of the hung window assembly;

wherein the lateral side of the mounting bracket comprises a ledge;

wherein the lateral side of the mounting bracket further comprises a slot comprising a first open end and a second open end, and wherein the slot provides a narrow passage that is at least partially bounded by a cantilevered surface extending over the passage;

wherein the ledge is spaced from the slot and the ledge is located nearer to the upper end of the mounting bracket than the slot;

wherein in an uninstalled, assembled configuration of the window balance, the uncurled end portion of the curl spring engages the mounting bracket at the ledge and at least a portion of the uncurled end portion of the curl spring is received in the slot, and wherein movement of the uncurled end portion of the curl spring relative to the mounting bracket in a direction perpendicular to the lateral side of the mounting bracket is substantially limited.

2. The window balance of claim 1, wherein the ledge is part of an upwardly opening support that extends generally laterally outwardly relative to the lateral side of the body of the mounting bracket and includes a portion extending generally upwardly from the ledge.

3. The window balance of claim 1, wherein in the uninstalled, assembled configuration of the window balance, the ledge opposes a bias of the curl spring.

4. The window balance of claim 1, wherein the slot is sized to accommodate the width of the uncurled end portion of the curl spring.

5. The window balance of claim 1, wherein in the uninstalled, assembled configuration of the window balance, a proximal part of the uncurled end portion of the curl spring extends from the first open end of the slot and a distal part of the uncurled end portion of the curl spring extends from the second open end of the slot.

6. The window balance of claim 1, wherein the mounting bracket comprises a first opening passing through a central portion of the body of the mounting bracket from the front side of the mounting bracket to the rear side of the mounting bracket and a second opening passing through the central portion of the body of the mounting bracket from the front side of the mounting bracket to the rear side of the mounting bracket; and wherein at least one of the first opening and the second opening comprises a countersink.

7. The window balance of claim 1, wherein the mounting bracket is symmetrical about a generally vertical plane bisecting the mounting bracket.

8. The window balance of claim 1, wherein the lateral side of the mounting bracket comprises a side wall comprising an inside face and an outside face.

9. The window balance of claim 1 wherein the passage is sized to closely fit the thickness of the uncurled end portion of the curl spring.

10. A window balance configured to be disposed in a vertical jamb of a hung window assembly and to connect to a moveable sash of the hung window assembly, the window balance comprising:

a mounting bracket;

a carrier comprising a housing extending from a first end to a second end, the housing defining an interior space;

a receiver supported by the carrier near the second end of the carrier;

a constant force curl spring coupled to the mounting bracket and comprising a curled portion at least partially located in the interior space of the housing of the carrier and an uncurled end portion extending from the curled portion outside of the interior space of the housing of the carrier, wherein the uncurled end portion comprises a width and a thickness;

wherein the mounting bracket is symmetrical about a vertical plane bisecting the mounting bracket;

wherein the mounting bracket comprises an opening passing through the mounting bracket from a first side of the mounting bracket to a second side of the mounting bracket, the opening configured to receive a fastener for attaching the mounting bracket to a jamb;

wherein a lateral side the mounting bracket comprises a vertical slot, wherein the slot comprises a first open end, a second open end and a cantilevered wall at least partially defining a side of the slot, wherein the lateral side of the mounting bracket further comprises a ledge;

wherein the uncurled end portion of the curl spring is received in the slot and extends from the first open end of the slot and the second open end of the slot;

wherein the slot is sized to closely fit at least one of the width and the thickness of the uncurled end portion of the curl spring; and wherein the slot limits movement of the uncurled end portion of the curl spring relative to the mounting bracket in a direction generally perpendicular to the slot.

11. The window balance of claim 10, wherein the slot limits movement of the uncurled end portion of the curl spring relative to the mounting bracket in a direction laterally outwardly from the lateral side of the mounting bracket.

12. The window balance of claim 10, wherein the mounting bracket is retained with the carrier by the curl spring.

13. The window balance of claim 10, wherein the lateral side of the mounting bracket further comprises an outwardly protruding projection defining the ledge and a wall extending upwardly from the ledge; and wherein the curl spring bears against the ledge when the window balance is in an uninstalled, assembled configuration.

14. The window balance of claim 10, wherein the lateral side of the mounting bracket comprises a side wall comprising an inside face and an outside face.

15. The window balance of claim 10, wherein, in an uninstalled, assembled configuration of the window balance, the mounting bracket is retained with the carrier.

16. The window balance of claim 10, wherein the mounting bracket is configured to be installed in a left-hand jamb of the hung window assembly or a right-hand jamb of the hung window assembly.

17. A hung window assembly comprising a window frame including a left-hand jamb and a right-hand jamb, a moveable sash a first window balance of claim 10 and a second window balance of claim 10;

wherein the first window balance of claim 10 is installed in a left-hand jamb of the window frame and the second window balance of claim 10 is installed in a right-hand jamb of the window frame;

wherein a first pivot bar is attached to a left-hand side of the moveable sash of the hung window assembly and a second pivot bar is attached to a right-hand side of the moveable sash of the hung window assembly; and wherein the first pivot bar is received in the receiver of the first window balance of claim 10 and the second pivot bar is received in the receiver of the second window balance of claim 10.

18. A window balance comprising:

a mounting bracket;

a carrier comprising a housing extending from a first end to a second end, the housing defining an interior space;

a receiver supported by the carrier near the second end of the carrier;

a constant force curl spring comprising a curled portion at least partially located in the interior space of the housing of the carrier and an uncurled end portion extending from the curled portion outside of the interior space of the housing of the carrier, wherein the uncurled end portion comprises a width and a thickness;

wherein the mounting bracket is symmetrical about a plane bisecting the mounting bracket;

wherein a lateral side the mounting bracket comprises a ledge and a vertical slot comprising a cantilevered wall at least partially defining a side of the slot;

wherein the uncurled end portion of the curl spring is received in the slot and coupled to the ledge;

wherein the slot limits movement of the uncurled end portion of the curl spring relative to the mounting bracket in a direction generally perpendicular to the slot; and wherein the slot is sized to closely fit at least one of the width and the thickness of the uncurled end portion of the curl spring.

19. The window balance of claim 18, wherein the ledge is spaced from the slot and the ledge is located nearer to an upper end of the mounting bracket than the slot.

20. The window balance of claim 18, wherein the plane bisecting the mounting bracket is a generally vertical plane.

21. A hung window assembly comprising a window frame including a left-hand jamb and a right-hand jamb, a moveable sash a first window balance of claim 20 and a second window balance of claim 20;

wherein the first window balance of claim 20 is installed in a left-hand jamb of the window frame and the second window balance of claim 20 is installed in a right-hand jamb of the window frame;

wherein a first pivot bar is attached to a left-hand side of the moveable sash of the hung window assembly and a second pivot bar is attached to a right-hand side of the moveable sash of the hung window assembly; and wherein the first pivot bar is received in the receiver of the first window balance of claim 20 and the second pivot bar is received in the receiver of the second window balance of claim 20.

22. The window balance of claim 18, wherein when the window balance is in an uninstalled, assembled configuration the curl spring bears against the ledge and the mounting bracket is retained with the carrier.

23. The window balance of claim 22, wherein the plane bisecting the mounting bracket is a generally vertical plane.

24. A hung window assembly comprising a window frame including a left-hand jamb and a right-hand jamb, a moveable sash a first window balance of claim 23 and a second window balance of claim 23;

wherein the first window balance of claim 23 is installed in a left-hand jamb of the window frame and the second window balance of claim 23 is installed in a right-hand jamb of the window frame;

wherein a first pivot bar is attached to a left-hand side of the moveable sash of the hung window assembly and a second pivot bar is attached to a right-hand side of the moveable sash of the hung window assembly; and wherein the first pivot bar is received in the receiver of the first window balance of claim 23 and the second pivot bar is received in the receiver of the second window balance of claim 23.

* * * * *